(12) United States Patent
Okubo et al.

(10) Patent No.: US 9,490,673 B2
(45) Date of Patent: Nov. 8, 2016

(54) ROTOR OF MAGNET-ASSISTED RELUCTANCE MOTOR AND BRUSHLESS MOTOR

(71) Applicant: MITSUBA Corporation, Gunma (JP)

(72) Inventors: Masayuki Okubo, Gunma (JP); Keisuke Mitsuoka, Gunma (JP); Masaru Watanabe, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 114 days.

(21) Appl. No.: 14/421,600

(22) PCT Filed: Aug. 10, 2013

(86) PCT No.: PCT/JP2013/071738
§ 371 (c)(1),
(2) Date: Feb. 13, 2015

(87) PCT Pub. No.: WO2014/027630
PCT Pub. Date: Feb. 20, 2014

(65) Prior Publication Data
US 2015/0303749 A1    Oct. 22, 2015

(30) Foreign Application Priority Data

Aug. 16, 2012  (JP) ................................ 2012-180357
Nov. 6, 2012   (JP) ................................ 2012-244733

(51) Int. Cl.
*H02K 1/27*   (2006.01)
*H02K 29/03*  (2006.01)
(Continued)

(52) U.S. Cl.
CPC ............ *H02K 1/2766* (2013.01); *H02K 1/246* (2013.01); *H02K 21/14* (2013.01); *H02K 29/03* (2013.01); *H02K 2213/03* (2013.01)

(58) Field of Classification Search
CPC .. H02K 21/12; H02K 15/0012; H02K 15/02; H02K 15/03; H02K 15/16; H02K 1/246; B22F 7/06; B22F 7/08
See application file for complete search history.

(56) References Cited

U.S. PATENT DOCUMENTS 5,903,080 A * 5/1999 Nashiki .................. H02K 1/246
                                                  310/162
5,945,760 A * 8/1999 Honda .................... H02K 1/276
                                                  310/156.53
(Continued)

FOREIGN PATENT DOCUMENTS

JP     2002-118994    4/2002
JP     2005-51982     2/2005
(Continued)

OTHER PUBLICATIONS

International Preliminary Report on Patentability (Chapter I of the PCT) issued Feb. 26, 2015, in Japanese Application No. PCT/JP2013/071738 (English translation).
(Continued)

*Primary Examiner* — Tran Nguyen
(74) *Attorney, Agent, or Firm* — Wenderoth, Lind & Ponack, L.L.P.

(57) ABSTRACT

A rotor includes S-pole and N-pole magnets which are arc-shaped in cross-section. Each pole has three magnets. Each magnet is embedded in the rotor in such a way that a convex side portion thereof faces center Or of the rotor. Distance Rs between center Os of circular arcs of S-pole magnets and center Or of the rotor is different from distance Rn between center On of circular arcs of N-pole magnets and center Or of the rotor (Rs≠Rn). The ratio of the two distances is 0.92 (Rs/Rn=0.92). An outer peripheral section of an innermost-layer S-pole magnet is disposed in such a way as to protrude into an adjacent pole zone N1 or N2 from a pole zone S1 or S2.

20 Claims, 29 Drawing Sheets

(51) Int. Cl.
*H02K 21/14* (2006.01)
*H02K 1/24* (2006.01)

(56) References Cited

U.S. PATENT DOCUMENTS

| | | | |
|---|---|---|---|
| 6,225,724 B1 * | 5/2001 | Toide | H02K 1/276 310/156.53 |
| 6,675,460 B2 * | 1/2004 | Reiter, Jr. | B22F 7/06 148/514 |
| 6,849,983 B2 * | 2/2005 | Tajima | H02K 1/246 310/156.53 |
| 8,026,649 B2 * | 9/2011 | Kolehmainen | H02K 1/246 310/216.015 |
| 2003/0063993 A1 * | 4/2003 | Reiter, Jr. | B22F 3/225 419/36 |

FOREIGN PATENT DOCUMENTS

| | | |
|---|---|---|
| JP | 3818340 | 6/2006 |
| JP | 2011-83066 | 4/2011 |

OTHER PUBLICATIONS

International Search Report (ISR) issued Sep. 17, 2013 in International (PCT) Application No. PCT/JP2013/071738.

* cited by examiner

Fig. 9
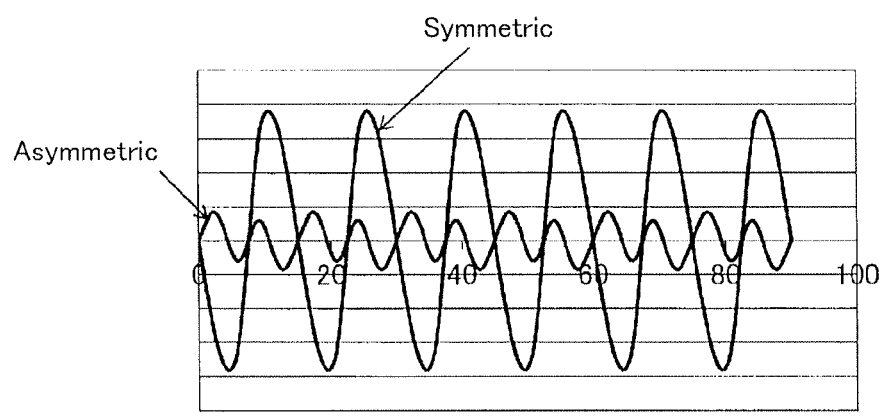
Fig.9A
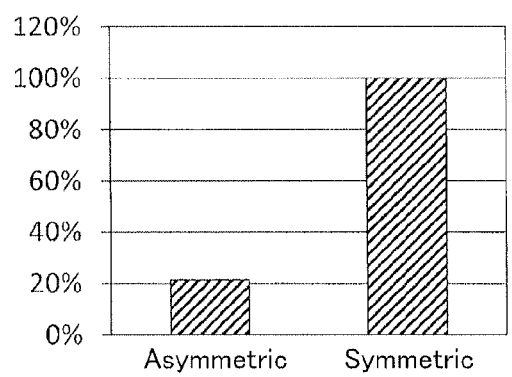
Fig.9B

Fig. 10
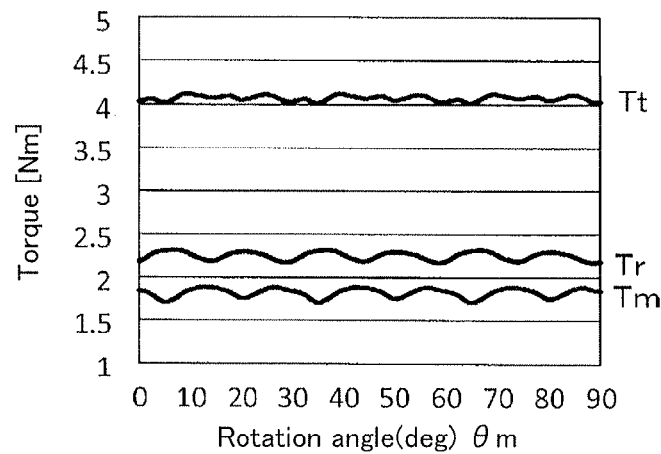
Fig.10A
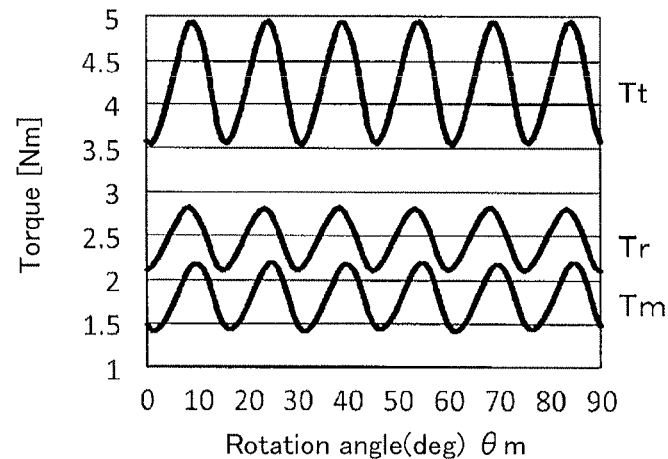
Fig.10B

Fig. 11
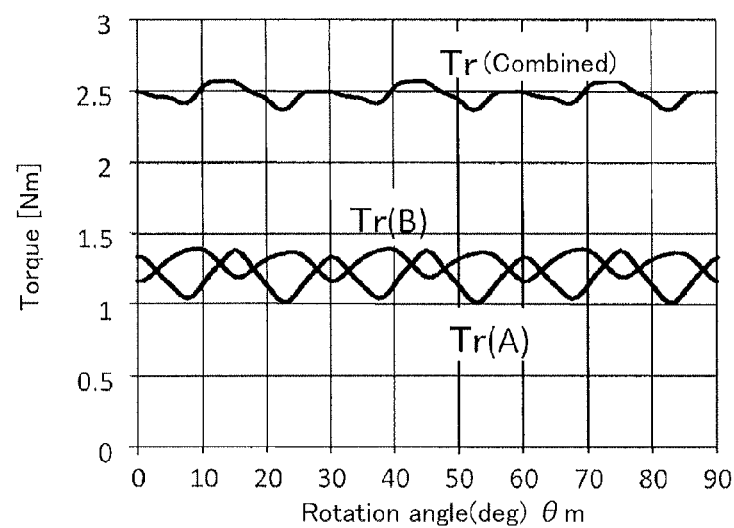
Fig.11A
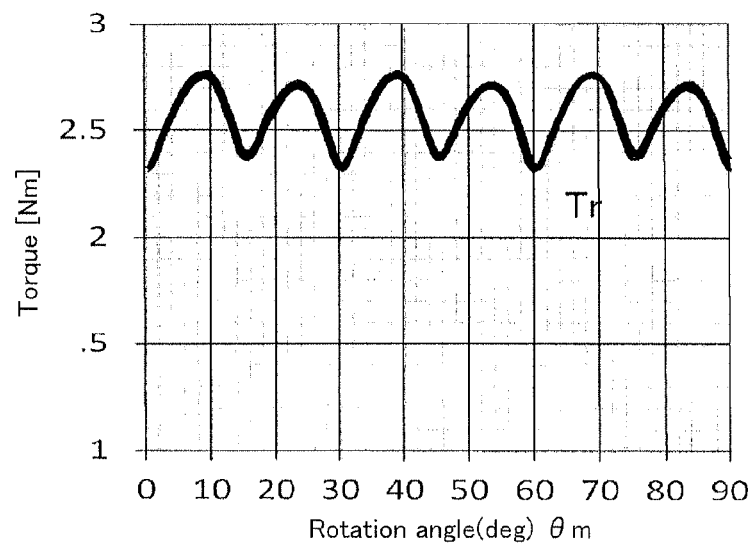
Fig.11B

Fig. 12
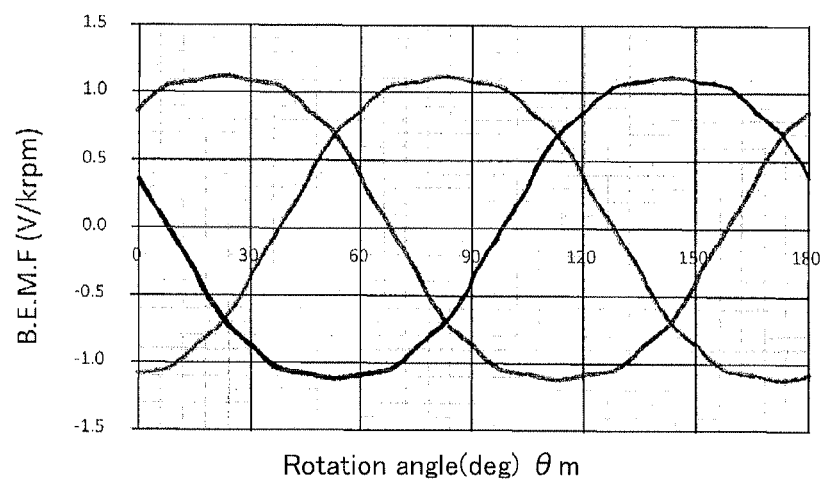
Fig.12A
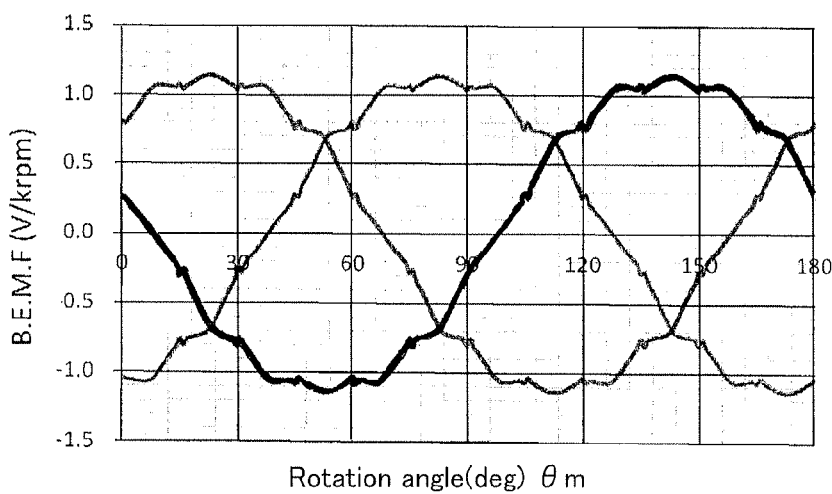
Fig.12B

Fig. 14
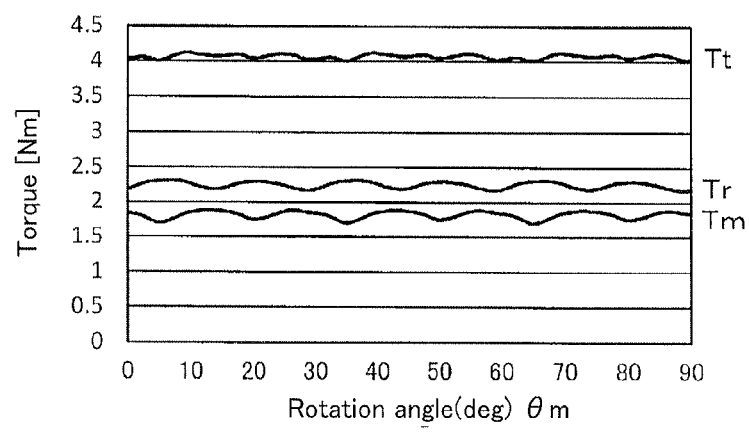
Fig.14A
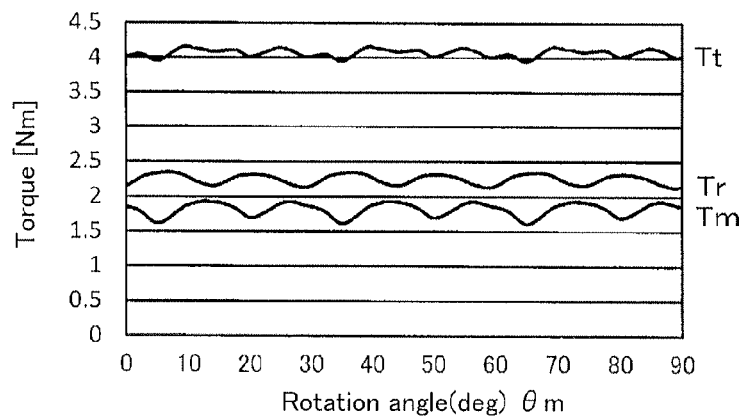
Fig.14B

Fig. 15
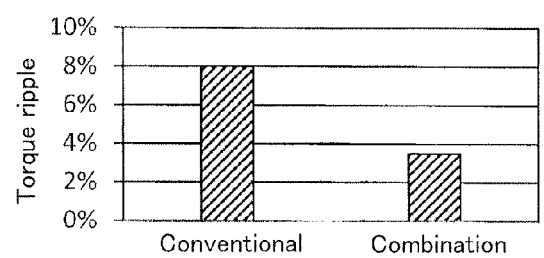
Fig.15A
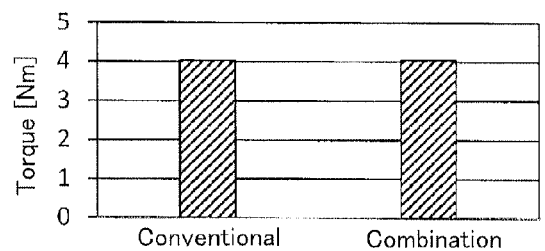
Fig.15B

Fig. 16
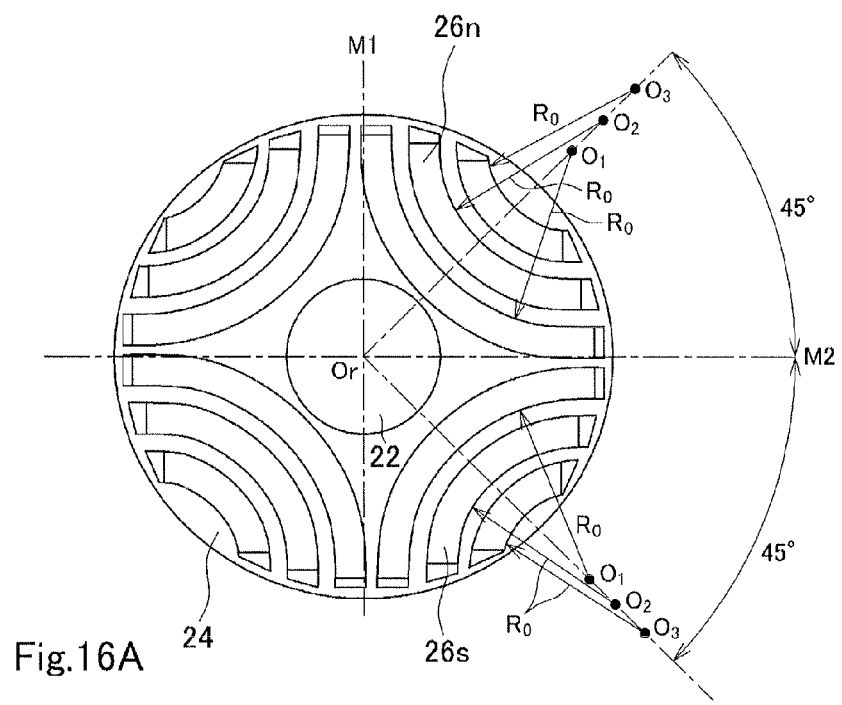
Fig.16A
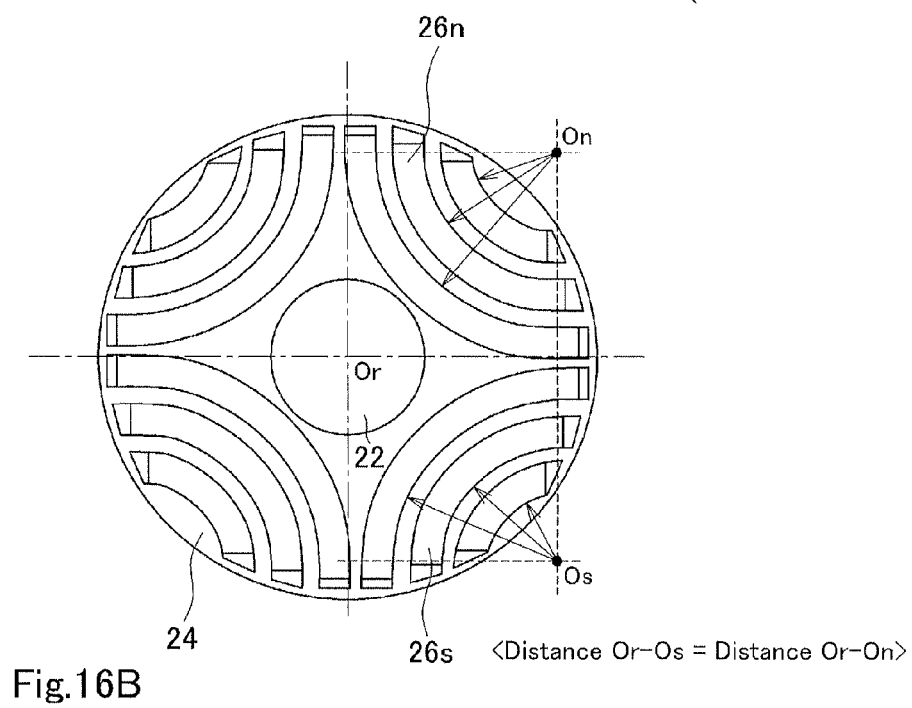
Fig.16B

Fig. 21
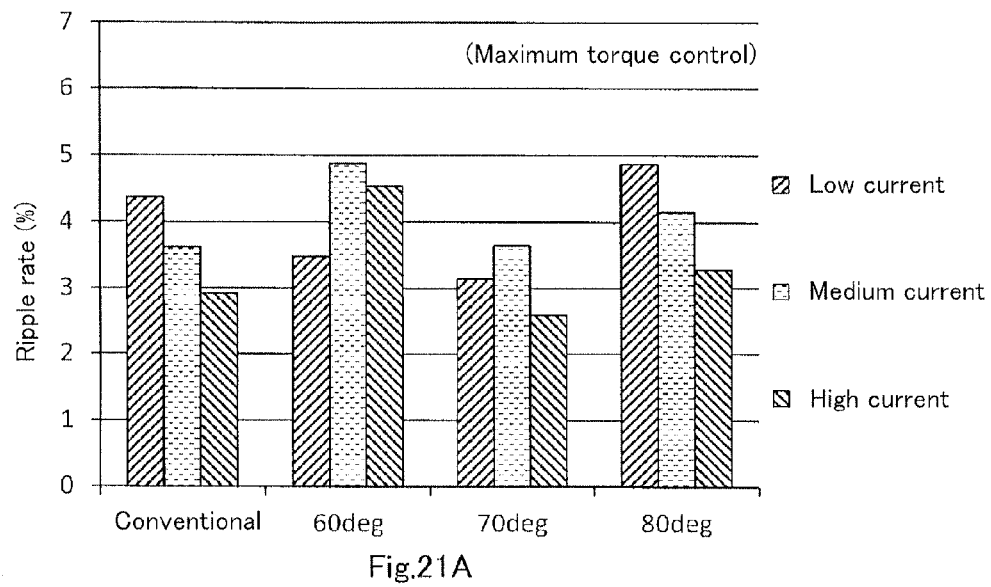
Fig.21A
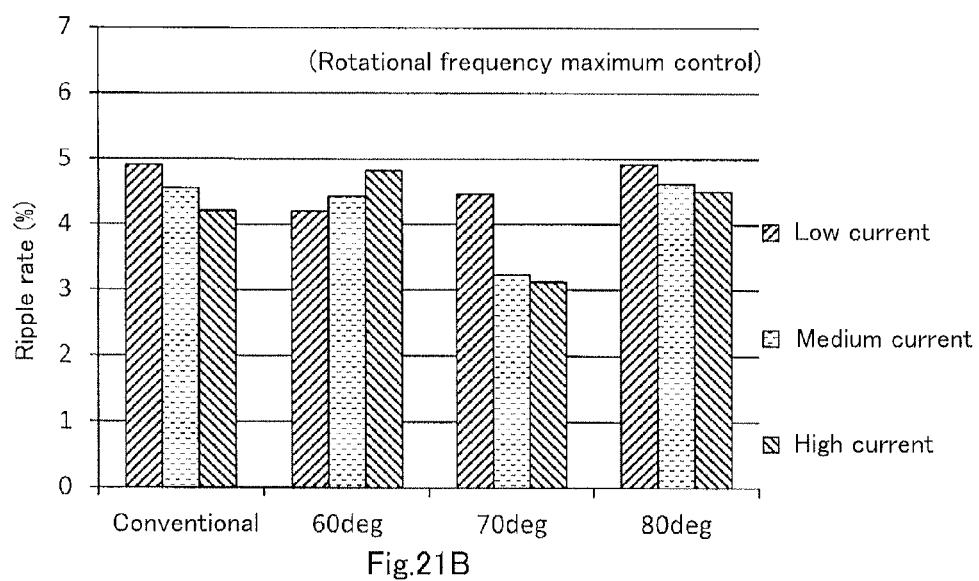
Fig.21B

* Current 120Apeak, Advance angle 50deg

Fig. 27
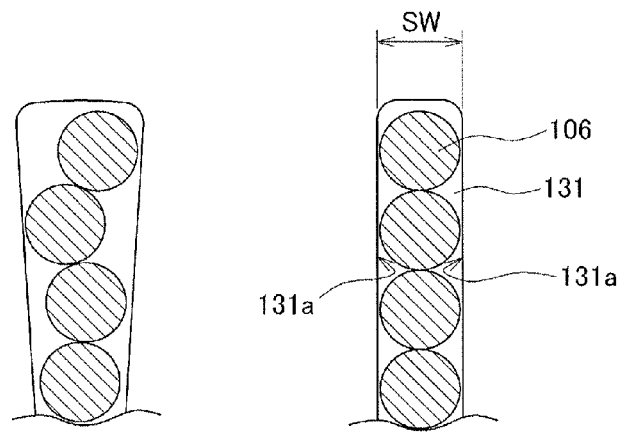
Fig.27A    Fig.27B
Fig. 28
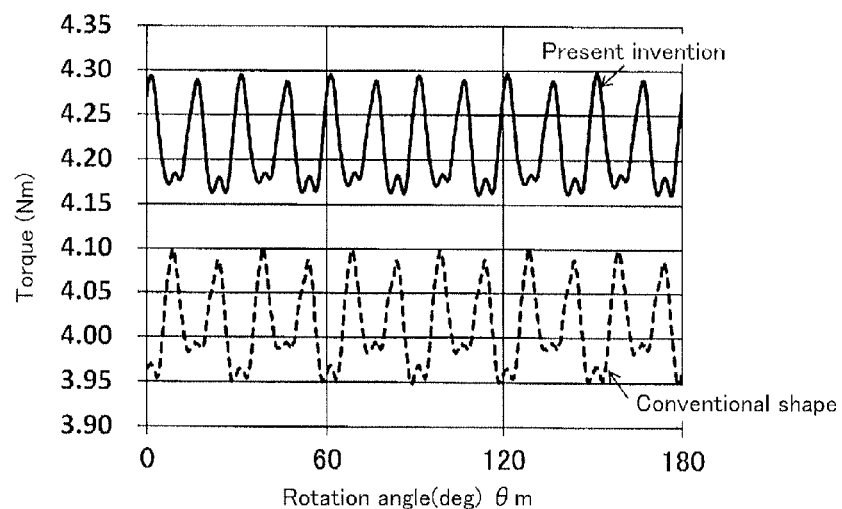

ROTOR OF MAGNET-ASSISTED RELUCTANCE MOTOR AND BRUSHLESS MOTOR

TECHNICAL FIELD

The present invention relates to a brushless motor in which a rotor is rotated by reluctance torque, and particularly to the configuration of a rotor used in a magnet-assisted reluctance motor in which the rotation of the rotor is assisted by magnetic force of a magnet embedded in the rotor.

BACKGROUND ART

As an electric motor of a type that generates a rotational force by utilizing a difference in magnetic resistance between a stator and a rotor, a reluctance motor has been known. In the reluctance motor, reluctance torque generated by the difference in magnetic resistance is used to rotate the rotor. However, since the reluctance torque is smaller than torque obtained by a magnet, compared with a motor of the same physical structure which uses a magnet, the output torque of the reluctance motor tends to be smaller. Therefore, the problem is that, in order to achieve a desired torque with the reluctance motor, the structure of the motor becomes larger.

In recent years, a magnet-assisted reluctance motor has been proposed, with a magnet being disposed on a rotor in the basic configuration of a reluctance motor. For example, Patent Document 1 discloses such a magnet-assisted reluctance motor, and shows a magnet embedded in a rotor of the reluctance motor. In the case of the motor of Patent Document 1, in one of the magnetic poles, i.e. N- or S-pole, of a rotor core, a first permanent magnet, which is high in magnetic flux density and is made of the same magnet material and has the same shape, is embedded. In the other magnetic pole, a second permanent magnet, which is different in shape from the first permanent magnet, is embedded. The second permanent magnet is made of the same magnet material that is low in magnetic flux density. According to this configuration, the reluctance motor uses assistance of the magnetic force from the magnet, and rotates the rotor with both the reluctance torque and the magnet torque, thereby leading to both an improvement in the output and a reduction in the size of the motor.

PRIOR ART DOCUMENTS

Patent Documents

[Patent Document 1] Japanese Patent No. 3,818,340
[Patent Document 2] Japanese Patent Application Laid-Open Publication No. 2011-83066

SUMMARY OF THE INVENTION

Problems to be Solved by the Invention

However, the problem with the magnet-assisted reluctance motor is that, because of the use of the magnet, cogging, which a reluctance motor has not experienced, occurs. Moreover, even in the magnet-assisted reluctance motor, as in the case of a normal reluctance motor that is not of a magnet-assisted type, a torque ripple, or a fluctuation in torque when being powered up, is a problem. That is, in the reluctance motor, the reluctance torque varies with the rotation of the rotor, thereby causing a torque ripple as the rotor is rotated.

Particularly when the magnet-assisted reluctance motor is used as a motor for an electric power steering device, cogging of the motor in the electric power steering device needs to be reduced because a steering wheel faces difficulty returning to the original position due to the cogging. Another problem is that the torque ripple makes the feeling of steering worse in the electric power steering device, and makes a driver feel frustrated. In terms of comfortable driving, the magnet-assisted reluctance motor is required to reduce the torque ripple.

Furthermore, in the motor of Patent Document 1, compared with the case where rare-earth magnets are used for both N- and S-poles, the motor is lower in magnetic flux density, and the motor toque becomes smaller. Meanwhile, if an attempt is made to obtain the same characteristics as when rare-earth magnets are used for both N- and S-poles by using the configuration of Patent Document 1, the problem arises that the structure of the motor becomes bigger, and that the torque ripple and cogging become larger accordingly.

As for the torque ripple, for example, in the case of Patent Document 2, a closed stator structure in which the tips of stators are connected together is adopted in order to make a fluctuation in reluctance torque smaller and reduce the torque ripple. However, even if the closed stator structure is adopted, magnetic flux from the stator becomes biased in the motor in which a rotor core outside a magnet becomes a magnetic path when current is being applied, and the torque ripple inevitably remains. Especially in the case of the magnet-assisted reluctance motor, the ratio of reluctance torque is large, and the problem therefore is that the impact of the torque ripple is large.

Means for Solving the Problems

A rotor of the present invention used in a magnet-assisted reluctance motor, which includes a stator that includes windings of a plurality of phases, and a rotor that is disposed inside the stator in a rotatable manner and which includes a plurality of internal mounting holes in which a plurality of permanent magnets are embedded, wherein a direction of magnetic flux formed by each of magnetic poles of the plurality of permanent magnets is set as d-axis, an axis that is magnetically orthogonal to d-axis is set as q-axis, a plurality of the d- and q-axes are alternately provided in a circumferential direction on the rotor, and the rotor is rotated by reluctance torque generated by a difference in magnetic resistance between the d-axis and q-axis directions and by magnet torque generated by the permanent magnets, is characterized in that: the plurality of permanent magnets include permanent magnets that are arc-shaped in cross-section and form a first magnetic pole which is N- or S-pole, and permanent magnets that are arc-shaped in cross-section and form a second magnetic pole that is different in polarity from the first magnetic pole; each of the permanent magnets that form the first and second magnetic poles is embedded in the rotor in such a way that a convex side portion thereof faces a center of the rotor; and when a cross section of the rotor is equally divided into regions to which each of the d-axes belongs with respect to each of the d-axes of the first and second magnetic poles, the permanent magnets of the first magnetic pole side are disposed in such a way as to protrude into a region of the second magnetic pole side without interfering with the permanent magnets of the second magnetic pole side.

Another rotor of the present invention used in a magnet-assisted reluctance motor, which includes a stator that includes windings of a plurality of phases, and a rotor that is disposed inside the stator in a rotatable manner and which includes a plurality of internal mounting holes in which a plurality of permanent magnets are embedded, wherein a direction of magnetic flux formed by each of magnetic poles of the plurality of permanent magnets is set as d-axis, an axis that is magnetically orthogonal to d-axis is set as q-axis, a plurality of the d- and q-axes are alternately provided in a circumferential direction on the rotor, and the rotor is rotated by reluctance torque generated by a difference in magnetic resistance between the d-axis and q-axis directions and by magnet torque generated by the permanent magnets, is characterized in that: the plurality of permanent magnets include permanent magnets that are three sides of a trapezoid in cross section and form a first magnetic pole which is N- or S-pole, and permanent magnets that are three sides of a trapezoid in cross section and form a second magnetic pole which is different in polarity from the first magnetic pole; each of the permanent magnets that form the first and second magnetic poles is embedded in the rotor in such a way that a convex side portion thereof faces a center of the rotor; and when a cross section of the rotor is equally divided into regions to which each of the d-axes belongs with respect to each of the d-axes of the first and second magnetic poles, the permanent magnets of the first magnetic pole side are disposed in such a way as to protrude into a region of the second magnetic pole side without interfering with the permanent magnets of the second magnetic pole side.

A brushless motor of the present invention, which includes a stator that includes windings of a plurality of phases, and a rotor that is disposed inside the stator in a rotatable manner and which includes a plurality of internal mounting holes in which a plurality of permanent magnets are embedded, wherein a direction of magnetic flux formed by each of magnetic poles of the plurality of permanent magnets is set as d-axis, an axis that is magnetically orthogonal to d-axis is set as q-axis, a plurality of the d- and q-axes are alternately provided in a circumferential direction on the rotor, and the rotor is rotated by reluctance torque generated by a difference in magnetic resistance between the d-axis and q-axis directions and by magnet torque generated by the permanent magnets, is characterized in that: the plurality of permanent magnets include permanent magnets that are arc-shaped in cross-section and form a first magnetic pole which is N- or S-pole, and permanent magnets that are arc-shaped in cross-section and form a second magnetic pole that is different in polarity from the first magnetic pole; each of the permanent magnets that form the first and second magnetic poles is embedded in the rotor in such a way that a convex side portion thereof faces a center of the rotor; and when a cross section of the rotor is equally divided into regions to which each of the d-axes belongs with respect to each of the d-axes of the first and second magnetic poles, the permanent magnets of the first magnetic pole side are disposed in such a way as to protrude into a region of the second magnetic pole side without interfering with the permanent magnets of the second magnetic pole side.

Another brushless motor of the present invention, which includes a stator that includes windings of a plurality of phases, and a rotor that is disposed inside the stator in a rotatable manner and which includes a plurality of internal mounting holes in which a plurality of permanent magnets are embedded, wherein a direction of magnetic flux formed by each of magnetic poles of the plurality of permanent magnets is set as d-axis, an axis that is magnetically orthogonal to d-axis is set as q-axis, a plurality of the d- and q-axes are alternately provided in a circumferential direction on the rotor, and the rotor is rotated by reluctance torque generated by a difference in magnetic resistance between the d-axis and q-axis directions and by magnet torque generated by the permanent magnets, is characterized in that: the plurality permanent magnets include permanent magnets that are three sides of a trapezoid in cross section and form a first magnetic pole which is N- or S-pole, and permanent magnets that are three sides of a trapezoid in cross section and form a second magnetic pole which is different in polarity from the first magnetic pole; each of the permanent magnets that form the first and second magnetic poles is embedded in the rotor in such a way that a convex side portion thereof faces a center of the rotor; and when a cross section of the rotor is equally divided into regions to which each of the d-axes belongs with respect to each of the d-axes of the first and second magnetic poles, the permanent magnets of the first magnetic pole side are disposed in such a way as to protrude into a region of the second magnetic pole side without interfering with the permanent magnets of the second magnetic pole side.

The brushless motor can be used as a drive source for an electric power steering device. Therefore, it is possible to provide a motor for electric power steering that can reduce torque ripple and cogging, leading to an improvement in the return of the steering wheel and the steering feeling.

Advantages of the Invention

As for the rotor of the magnet-assisted reluctance motor of the present invention, in the rotor used in the magnet-assisted reluctance motor in which the rotor rotates by using assistance of a magnetic force of a magnet, the permanent magnets that are arc-shaped in cross-section are used to form the first and second magnetic poles, and the permanent magnets of the first magnetic pole side are disposed in such a way as to protrude into a region of the second magnetic pole side without interfering with the permanent magnets of the second magnetic pole side. Therefore, it is possible to reduce the torque ripple and cogging of the reluctance motor that uses the rotor.

As for another rotor of the magnet-assisted reluctance motor of the present invention, in the rotor used in the magnet-assisted reluctance motor in which the rotor rotates by using assistance of a magnetic force of a magnet, the permanent magnets whose cross section is in a shape formed by three sides of a trapezoid are used to form the first and second magnetic poles, and the permanent magnets of the first magnetic pole side are disposed in such a way as to protrude into a region of the second magnetic pole side without interfering with the permanent magnets of the second magnetic pole side. Therefore, it is possible to reduce the torque ripple and cogging of the reluctance motor that uses the rotor.

As for the brushless motor of the present invention, in the magnet-assisted reluctance motor in which the rotor rotates by using assistance of a magnetic force of a magnet, what is used as that rotor is a rotor in which: the permanent magnets that are arc-shaped in cross-section are used to form the first and second magnetic poles, and the permanent magnets of the first magnetic pole side are disposed in such a way as to protrude into a region of the second magnetic pole side without interfering with the permanent magnets of the second magnetic pole side. Therefore, it is possible to reduce the torque ripple and cogging of the motor.

As for another brushless motor of the present invention, in the magnet-assisted reluctance motor in which the rotor rotates by using assistance of a magnetic force of a magnet, what is used as that rotor is a rotor in which: the permanent magnets whose cross section is in a shape formed by three sides of a trapezoid are used to form the first and second magnetic poles, and the permanent magnets of the first magnetic pole side are disposed in such a way as to protrude into a region of the second magnetic pole side without interfering with the permanent magnets of the second magnetic pole side. Therefore, it is possible to reduce the torque ripple and cogging of the motor.

Furthermore, in another brushless motor of the present invention, in the magnet-assisted reluctance motor, the tooth tip portions of the stator are connected together via the bridge section, and slits are provided in order to house magnets in the rotor. The magnetic pole sections are formed along the circumferential direction of the rotor by each of the magnets. If the circumferential-direction length of the bridge section is represented by W1, and the distance between the slits in the magnetic pole section of the same polarity by W2, W1 and W2 are set in such a way that W1≤W2. Therefore, it is possible to reduce the torque ripple.

BRIEF DESCRIPTION OF THE DRAWINGS

FIG. 9A is an explanatory diagram showing torque fluctuations when magnets are asymmetrically disposed based on settings (a) to (c) of the present invention and when magnets are symmetrically disposed as before; FIG. 9B is an explanatory diagram showing a difference in cogging torque between the above two.

FIG. 10A is an explanatory diagram showing output torque when magnets are asymmetrically disposed based on settings (a) to (c) of the present invention.; FIG. 10B is an explanatory diagram showing output torque when magnets are symmetrically disposed as before.

FIG. 11A is an explanatory diagram showing reluctance torque when magnets are asymmetrically disposed based on settings (a) to (c) of the present invention; FIG. 11B is an explanatory diagram showing reluctance torque when magnets are symmetrically disposed as before.

FIG. 12A is an explanatory diagram showing induced voltage waveform when magnets are asymmetrically disposed based on settings (a) to (c) of the present invention; FIG. 12B is an explanatory diagram showing induced voltage waveform when magnets are symmetrically disposed as before.

FIG. 14A is an explanatory diagram showing waveform of torque when an outer periphery of a rotor is made eccentric; FIG. 14B is an explanatory diagram showing waveform of torque when an outer periphery of a rotor is not made eccentric.

FIG. 15A is an explanatory diagram showing a comparison between torque ripple caused by the use of a rotor in which settings (1) to (3) of the present invention are used in combination, and torque ripple caused by the use of a rotor in which conventional settings (not settings (1) to (3)) are used; FIG. 15B is an explanatory diagram showing a comparison between torque caused by the use of a rotor in which settings (1) to (3) of the present invention are used in combination, and torque caused by the use of a rotor in which conventional settings are used.

FIG. 16 is an explanatory diagram showing a modified example of magnet arrangement.

FIG. 21 is a graph showing a comparison of torque ripple rate between when conventional specifications are used and when taper angle θt is 60, 70, or 80 degrees.

FIG. 27 is an explanatory diagram showing the state of a winding housed in a slot; FIG. 27A shows a conventional structure of a fan-shaped slot; FIG. 27B shows the configuration of a motor of the present invention that uses a parallel slot structure.

FIG. 28 is a graph showing results of experiments by the inventors, showing relation between rotor rotation angle and torque.

EMBODIMENTS FOR CARRYING OUT THE INVENTION

Hereinafter, embodiments of the present invention will be described in detail based on the accompanying drawings. The object of the embodiments described below is to increase output of a brushless motor, or particularly of a magnet-assisted reluctance motor, and to reduce cogging torque and a torque ripple in a well-balanced manner.
(First Embodiment)

Figure 1:
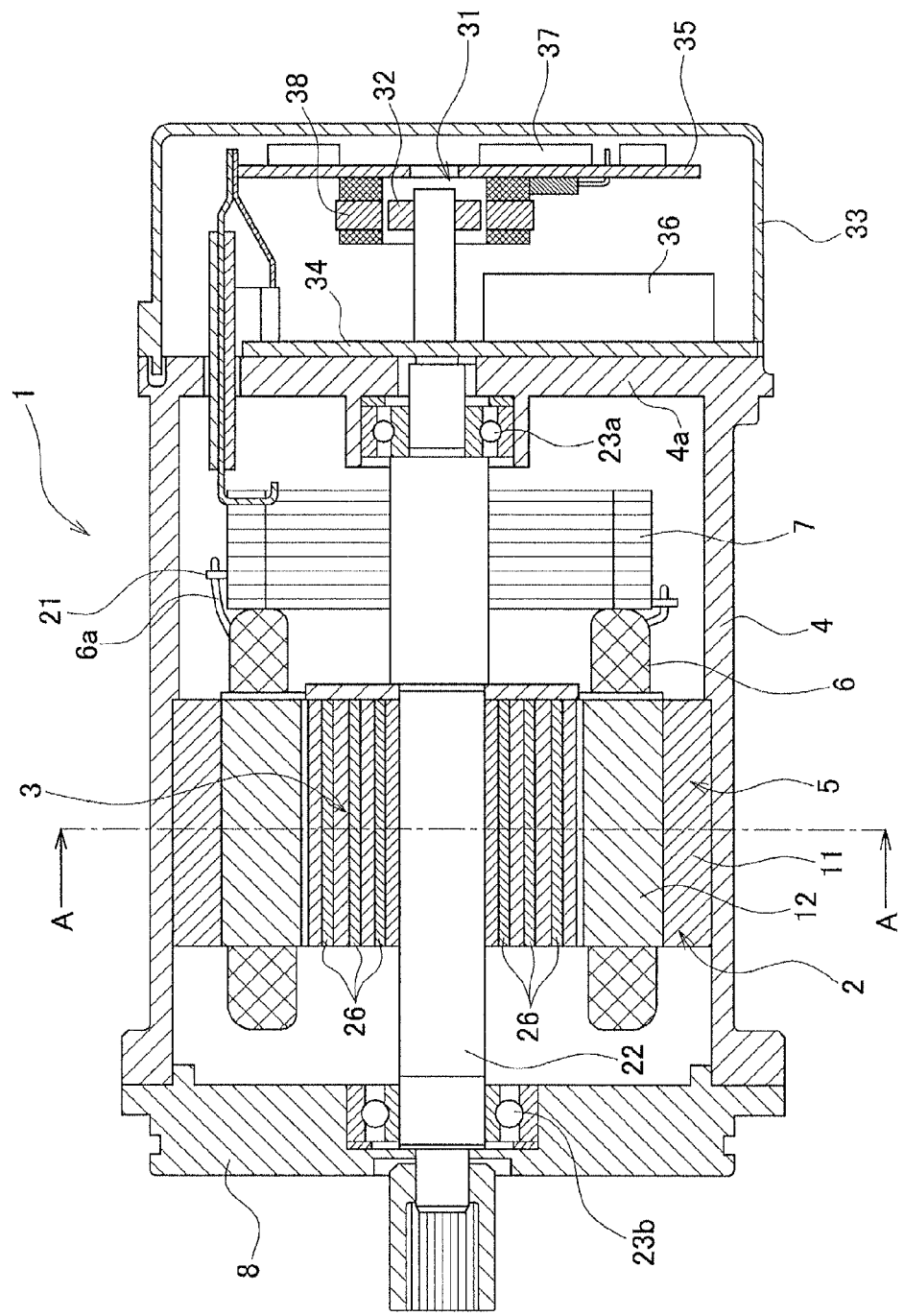
FIG. 1 is a cross-sectional view of a brushless motor according to a first embodiment of the present invention.
Figure 2:
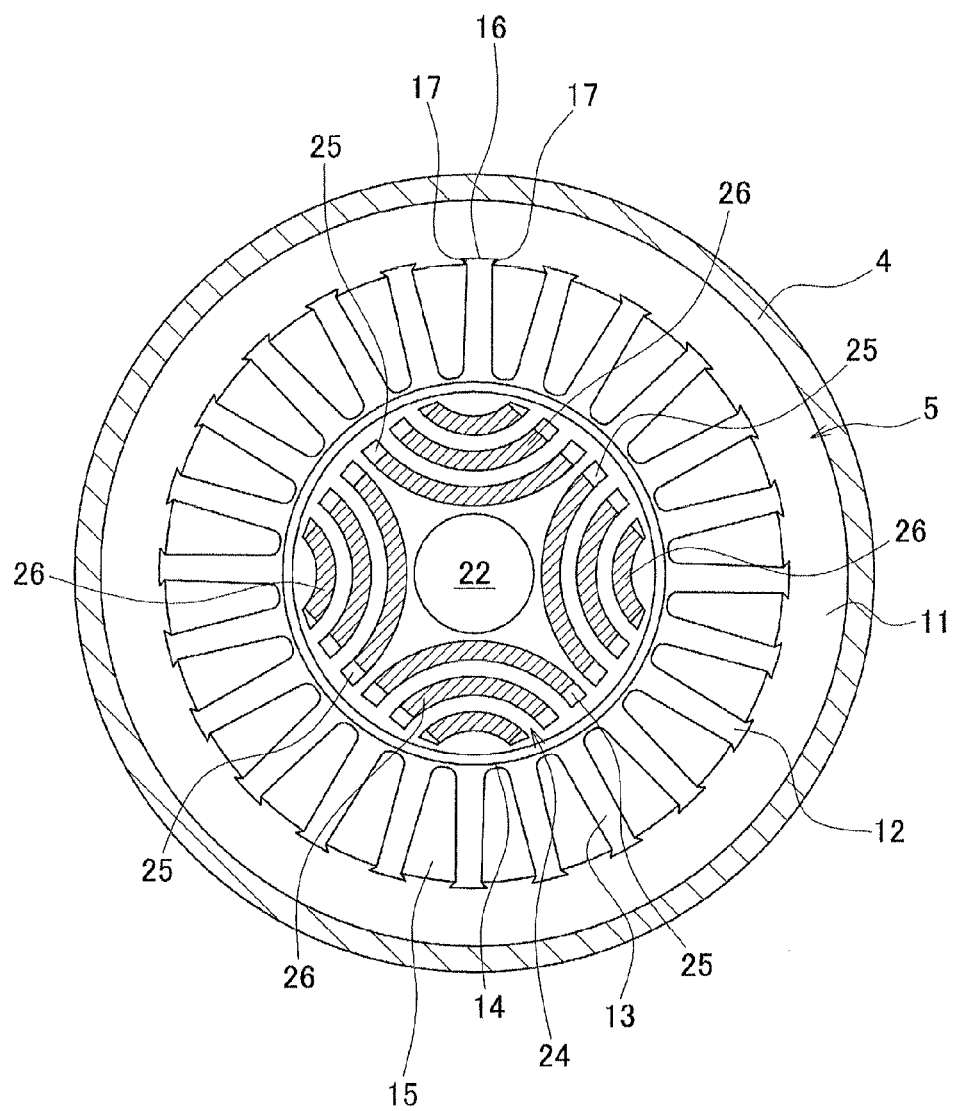
FIG. 2 is a cross-sectional view of FIG. 1 taken along line A-A.

FIG. 1 is a cross-sectional view of a brushless motor 1 (simply referred to as motor 1, hereinafter) according to a first embodiment of the present invention. FIG. 2 is a cross-sectional view of FIG. 1 taken along line A-A. The motor 1 is a magnet-assisted reluctance motor that is based on a reluctance motor and uses assistance of a magnetic force of a magnet disposed in a rotor. For example, the motor 1 is used as a drive source for an electric power steering device. As shown in FIG. 1, the motor 1 is a brushless motor of an inner rotor type in which, as in the case of a typical reluctance motor, a stator (Stator) 2 is located on the outer side and a rotor (Rotor) 3 is on the inner side.

The stator 2 includes a motor casing 4 of a bottomed cylindrical shape; a stator core 5; and a stator coil 6 (simply referred to as coil 6, hereinafter), which is wound around the stator core 5; and a bus bar unit (terminal unit) 7, to which the coil 6 mounted on the stator core 5 is electrically connected. The motor casing 4 is made of iron or the like and formed into a bottomed cylindrical shape. In an opening of the motor casing 4, with fixing screws (not shown), a bracket 8 made by aluminum die-casting is attached. After the coil 6 is wound around the stator core 5, the stator core 5 is pressed into the motor casing 4 and fixed to the inner peripheral surface thereof. The motor 1 adopts so-called outer winding, with the coil 6 disposed on the stator 2, which is an outer member. The outer-winding motor can achieve an improvement in the output of the motor because the motor can increase the space factor of the winding than a motor in which a coil is wound around an inner member.

Figure 3:
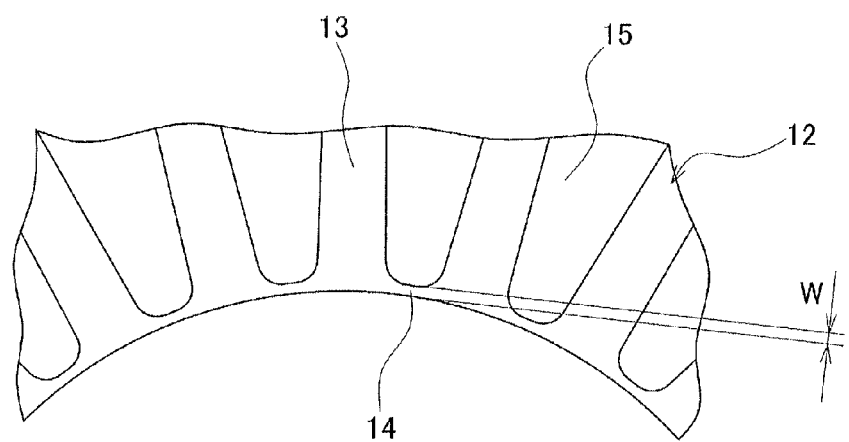
FIG. 3 is an explanatory diagram showing the configuration of a bridge section.

As shown in FIG. 2, the stator core 5 includes a cylindrical outer stator 11 and an inner stator 12, which is attached to an inner peripheral side of the outer stator 11. The outer stator 11 and the inner stator 12 are made by stacking magnetic steel sheets with thickness t (t=about 0.35 to 0.70 mm). The inner stator 12 includes 24 tooth sections 13, which are radially formed; and a bridge section 14, which connects the inner peripheral sides of the tooth sections 13 together. Between adjacent tooth sections 13, slots 15 are formed. As shown in FIG. 3, in this motor 1, radial-direction width W of the bridge section 14 is set in the range of t≤W≤1.5 mm: t is the sheet thickness of one of the steel sheets that make up the stack of the stator core 5.

In the motor 1, the inner peripheral sides of the tooth sections 13 are connected by the bridge section 14.

Accordingly, unlike a typical motor, a coil cannot be wound around the teeth with the use of slits on the teeth's tip sides. In the case of the motor 1, the stator 2 is divided into the outer stator 11 and the inner stator 12, and the teeth sections' outer peripheral sides of the inner stator 12 are made open. This configuration enables formation of the coil 6, by winding a copper wire around the tooth sections 13. After the coil 6 is wound around the teeth sections 13 in a distributed winding pattern, the teeth sections 13 are mounted on the inner peripheral side of the outer stator 11 (Fitting and fixing). In this manner, the stator core 5 is formed, with the coil 6 housed in the slots 15. Incidentally, the distributed winding can keep the leak of magnetic flux in the bridge section 14 lower than concentrated winding, and can have a larger maximum torque than the concentrated winding. Therefore, the coil 6 is wound in a distributed winding pattern in the motor 1.

Figure 4:
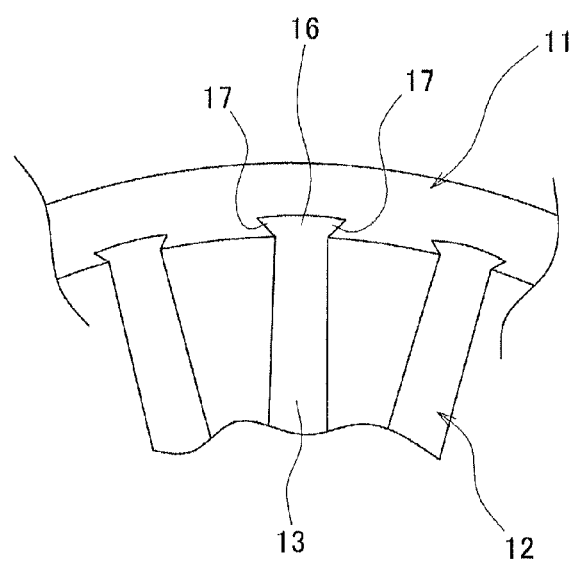
FIG. 4 is an explanatory diagram showing the configuration of fitting-fixing sections of an outer stator and an inner stator.

FIG. 4 is an explanatory diagram showing the configuration of fitting-fixing sections of the outer stator 11 and inner stator 12. In the motor 1, 24 tooth sections 13 are provided. The outer peripheral sides of the tooth sections 13 are fitted and fixed into tooth mounting grooves (concave sections) 16, which are formed on the inner peripheral surface of the outer stator 11. As shown in FIG. 4, on the outer stator 11, the tooth mounting grooves 16, which are dovetail grooves that are V-shaped in cross section, are formed. The tooth mounting grooves 16 are provided over the entire length of the outer stator 11 in such a way as to extend along an axis direction. On the outer peripheral ends of the tooth sections 13, tenon-shaped fitting sections 17 are formed in such a way as to have enlarged outer ends.

The outer stator 11 and the inner stator 12 are fixed in such a way as not to be separated in the radial and circumferential directions, as the fitting sections 17 are inserted and fitted into the tooth mounting grooves 16 in the axis direction. As a result, the rotational-direction movement of the inner stator 12 is restricted, and a positional shift of the inner stator 12 associated with a rotational-direction force can be reliably prevented.

On a one end side of the stator core 5, the bus bar unit 7 is mounted. The bus bar unit 7 is made by insert molding of a bus bar, which is made of copper, into a main body made of synthetic resin. Around the bus bar unit 7, a plurality of power supply terminals 21 are provided in such a way as to protrude in the radial direction. When the bus bar unit 7 is to be mounted, to the power supply terminals 21, ends 6a of coils 6, which are pulled out from the stator core 5, are welded. The number of bus bars provided in the bus bar unit 7 matches the number of phases of the motor 1 (In this case, a total of four bas bars are provided, with three for three phases, U-phase, V-phase, and W-phase, and one for connection between the phases). Each coil 6 is electrically connected to a power supply terminal 21 corresponding to the phase thereof. After the bus bar unit 7 is mounted, the stator core 5 is pressed and fixed into the motor casing 4.

Inside the stator 2, the rotor 3 is inserted. The rotor 3 includes a rotor shaft 22. The rotor shaft 22 is supported by bearings 23a and 23b in a rotatable manner. The bearing 23a is fixed to the center of a bottom section 4a of the motor casing 4. The bearing 23b is fixed to a central portion of the bracket 8. To the rotor shaft 22, a cylindrical rotor core 24 and a rotor (resolver rotor) 32 of a resolver 31, which is a rotational angle detection means, are attached.

On the outer side (or right side in FIG. 1) of the bottom section 4a of the motor casing 4, a cover 33 is attached. The rotor shaft 22 extends from the bottom section 4a of the motor case 4 into the cover 33. On the tip of the rotor shaft 22, the resolver rotor 32 is mounted. Inside the cover 33, control boards 34 and 35 are housed. On the control board 34, a power system element 36 is mounted. On the control board 35, a control system element 37 is mounted. On the control board 35, a resolver stator 38 is mounted in such a way as to face the outer peripheral side of the rotor of the resolver 31. On the resolver stator 38, a signal line of a rotational angle detection coil is provided. The resolver stator 38 is electrically connected to the control system element 37 via the signal line.

The rotor core 24, which makes up the rotor 3, is made by stacking a large number of disk-shaped magnetic steel sheets. On the steel sheets that make up the rotor core 24, a plurality of slits 25 are provided as mounting holes in which magnets are to be mounted. The slits 25 are curved into an arc. There is space inside the slits 25. If the direction of magnetic flux formed by magnetic poles (or central axis of permanent magnets) is referred to as d-axis, and if the axis that is magnetically orthogonal to d-axis (axis between permanent magnets) is set as q-axis, a plurality of sets of slits 25 are provided, with q-axis, which is perpendicular to the rotor shaft 22, as a boundary. The slits 25 are disposed in an arc shape around imaginary points (described later; centers Os and On of circular arcs of S- and N-pole magnets 26$n$ and 26$s$), which are set outside the outer periphery of the rotor 3 on d-axis. In the motor 1, four sets of a plurality of slits 25 are provided in an arc shape around the imaginary points on d-axis. In each set, a plurality of layers of magnetic paths are formed. Incidentally, after magnets 26, described later, are embedded in the slits 25, the spaces formed in the end portions by the slits 25 and the magnets 26 function as a flux barrier, so that magnetic resistance of the rotor 3 varies along the rotational direction.

In the case of a normal reluctance motor, in order to change the magnetic resistance of the rotor 3, the slits 25 are left hollow and used as a flux barrier. In the motor 1 of the present invention, in order to increase the output, a plurality of magnets (permanent magnets) 26 are embedded in the slits 25. In the motor 1, the reluctance torque is regarded as main force, and the magnet torque as auxiliary force. Accordingly, inexpensive ferrite magnets are used as magnets 26. However, in order to further increase the output, neodymium bonded magnets or other rare-earth magnets may be used as magnets 26.

Figure 5:
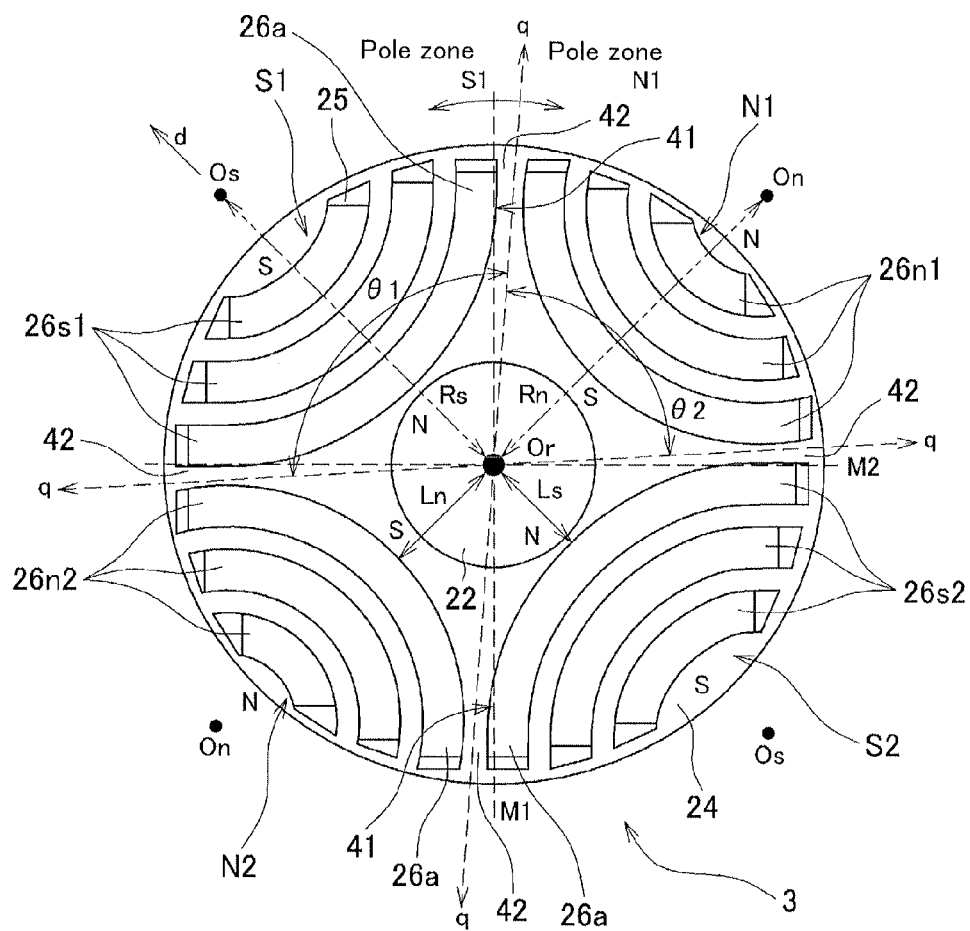
FIG. 5 is an explanatory diagram showing the configuration of a rotor.

FIG. 5 is an explanatory diagram showing the configuration of the rotor 3. In the rotor 3 of FIG. 5, as a plurality of magnets 26, magnets 26$s$ (26$s$1, 26$s$2) whose outer peripheral sides serve as S-poles, and magnets 26$n$ (26$n$1, 26$n$2) whose outer peripheral sides serve as N-poles, are provided. That is, the rotor 3 has a four-pole structure, and the motor 1 is so formed as to have a four-pole 24-slot structure (2-pole 12-slot×2). The rotor 3 of the present invention has three features as described below.

(1) The magnets 26 of each pole are formed into a circular arc. Sets of three magnets 26 are provided along the radial direction, and a plurality of d-axes and q-axes are provided alternately in the circumferential direction on the rotor 3. Therefore, it is possible to strengthen the torque with the help of the magnet torque, while making effective use of the reluctance torque.

(2) S-pole magnets 26$s$1 and 26$s$2 and N-pole magnets 26$n$1 and 26$n$2 are disposed asymmetrically about the center line, thereby reducing the torque ripple and the cogging.

(3) The rotor 3 is shaped in such a way as to have an eccentric outer periphery. Therefore, the torque ripple can be reduced.

Each of the features will be described below.

(1) Arrangement of Three Arc-Shaped Magnets

As for the above feature (1), in the rotor 3, as described above, the direction of magnetic flux formed by magnetic poles is referred to as d-axis, and the axis that is magnetically orthogonal to d-axis is regarded as q-axis. In the rotor 3, a plurality of d-axes and q-axes are set. In this case, d-axes and q-axes are alternately provided along the circumferential direction. In the rotor 3, in order to make it easier for q-axis magnetic flux to pass, arc-shaped slits 25 are provided. In the slits 25, arc-shaped magnets 26 are embedded. That is, the rotor 3 is formed in such a way as to make it easier for q-axis magnetic flux to pass and to increase inductance Lq. Therefore, it is possible to increase the magnet torque caused by the magnets 26 and to obtain sufficient torque even with ferrite magnets.

In this case, by increasing the number of circular arcs (slits 25), magnetic paths can be increased in number, and the magnet torque can be strengthened. However, in order to increase the number of slits 25, the magnets 26 need to be made thinner. Moreover, if a large number of slits 25 are provided, the magnetic paths on the steel sheets become smaller in width, leaving the rotor prone to magnetic saturation. Furthermore, Ld−Lq (difference between Ld and Lq) for obtaining the reluctance torque does not change so much even when the number of magnets 26 (or number of layers) is greater than or equal to three. Therefore, a realistic number of magnets 26 (or number of layers) is about three. In the case of the rotor 3, the magnets 26 are formed as three layers.

The slits 25$a$ to 25$c$ in each layer are so formed as to have the same radius regardless of whether the slits are for N- or S-pole. For the magnets 26$a$ (innermost layer), 26$b$ (intermediate layer), and 26$c$ (outermost layer) in each layer, the same magnet is used. That is, the magnets 26 require three types of magnet, 26$a$ to 26$c$, thereby leading to a reduction in the number of components.

(2) Asymmetrical Arrangement of Magnets

As for the above feature (2), in the rotor 3, the asymmetrical setting of magnets reduces the torque ripple. In this case, the asymmetrical setting of the rotor 3 is characterized in that:

(a) The cross-section of the rotor 3 is equally divided into regions to which each d-axis belongs, with respect to each of d-axes of magnets 26$s$ (first magnetic pole) and magnets 26$n$ (second magnetic pole). Then, an innermost magnet 26$a$ of one pole (S-pole in this case) with respect to center lines M1 and M2 of the rotor 3 that are perpendicular to each other and serve as division lines for each region is disposed in such a way as to protrude into an adjacent pole zone (region). The magnet protruding into the adjacent pole zone does not interfere with a magnet of an adjacent pole, and a space for a q-axis magnetic path is secured. As a result, angle θ1 (central angle around center Or of the rotor 3) of a magnet 26$s$'s region that is divided by q-axis is set larger than angle θ2 (same as above) of a magnet 26$n$'s region (θ1>θ2).

(b) The central positions of magnets 26 are different between S- and N-poles. That is, the distance (magnet center distance) Rs ($R_1$) between center Os (first center point) of a circular arc of S-pole magnets 26$s$ and center Or of the rotor 3 is different from the distance (magnet center distance) Rn ($R_2$) between center On (second center point) of a circular arc of N-pole magnets 26*n* and center Or of the rotor 3 (Rs≠Rn).

(c) The distance (shortest distance) Ls ($L_1$) between the innermost magnet 26*a* of S-pole and center Or of the rotor 3 is different from the distance (shortest distance) Ln ($L_2$) between the innermost magnet 26*a* of N-pole and center Or of the rotor 3 (Ls≠Ln).

(a) Lapping of Magnets

As shown in FIG. 5, in the rotor 3, with respect to each of d-axes of magnets 26*s* (first magnetic pole) and magnets 26*n* (second magnetic pole), there are four regions, which are defined by equally dividing the cross-section of the rotor 3 into regions to which each d-axis belongs, or four pole zones S1, N1, S2, and N2, which are defined by center lines M1 and M2. In the rotor 3 of the present invention, an outer peripheral portion 41 of an S-pole magnet 26*s* of an innermost layer (or a layer closest to rotor center Or) protrudes into the adjacent pole zone N1 or N2 of the other pole from the pole zone S1 or S2. Incidentally, a magnet that protrudes into an adjacent zone-side region may be of either S- or N-pole. What is shown here is the case where an S-pole magnet 26*s* has lapped over into (or protruded into) an N-pole zone. The larger a lap margin into an adjacent zone becomes, the more the torque ripple can be reduced. However, in order to prevent interference with an adjacent pole, between an S-pole magnet 26*s* and an adjacent N-pole magnet 26*n*, a space 42 is provided.

Figure 6:
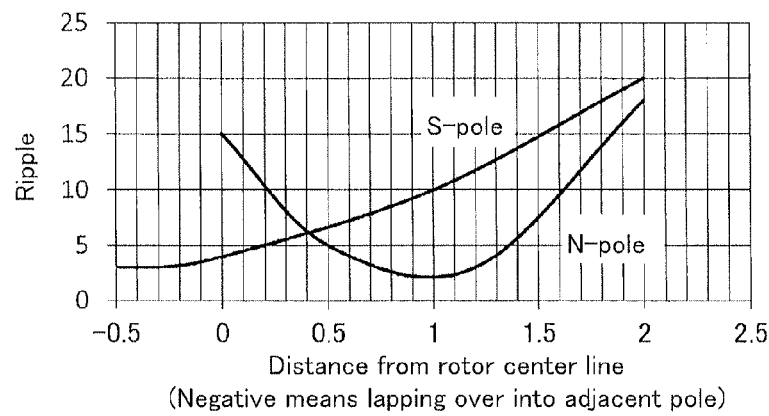
FIG. 6 is a graph showing each pole's trend in results of analysis of relation between a distance between an innermost-layer magnet of each pole and a center line and toque ripple with the use of modeFRONTIER® for combinations of the distance between the magnet and the center line.

FIG. 6 is a graph showing each pole's trend in results of analysis of relation between the distance between an innermost-layer magnet 26*a* of each pole and center line M1, M2 and toque ripple with the use of modeFRONTIER® (Multipurpose robust design optimization support tool: trade name) for combinations of the distance between the magnet and the center line. Incidentally, on the horizontal axis of FIG. 6, a negative value indicates the situation where a magnet has lapped over into an adjacent pole zone. As can be seen from FIG. 6, the S-pole lapping reduces the ripple. However, in the case of N-pole, the ripple becomes smaller when being some distance away from the center line. Meanwhile, if the S-pole interferes with the N-pole, the S-pole ripple increases (when the S-pole is set in such a way as to protrude). If the distance between the poles is too small, the torque decreases. Accordingly, in the case of the rotor 3, while an S-pole magnet 26*s* has lapped over into an N-pole zone, the space 42, whose size (e.g. 1.2 mm) is about twice as large as the sheet thickness (about 0.35 to 0.70 mm) of the magnetic steel sheets, is provided between the S-pole magnet 26*s* and the N-pole magnet 26*n*.

(b) Shift of Central Position of Pole

Figure 7:
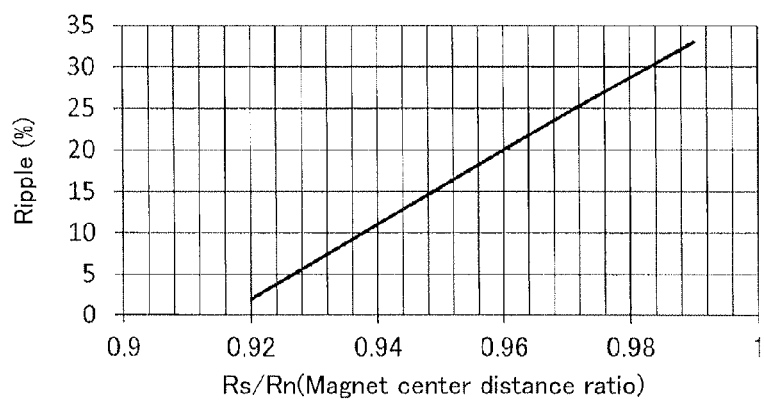
FIG. 7 is a graph showing relation between the ratio of magnet center distances Rs and Rn and the torque ripple.

FIG. 7 is a graph showing relation between the ratio of magnet center distances Rs and Rn and the torque ripple. As can be seen from FIG. 7, as the Rs/Rn becomes larger, the torque ripple increases. Therefore, the smaller the Rs/Rn becomes, the more the torque ripple is reduced. However, after the Rs/Rn becomes less than 0.92, an S-pole magnet 26*s* interferes with an N-pole magnet 26*n*. Accordingly, the Rs/Rn that is set to 0.92 is optimal to reduce the torque ripple.

(c) Shift in Arrangement of Magnets

Figure 8:
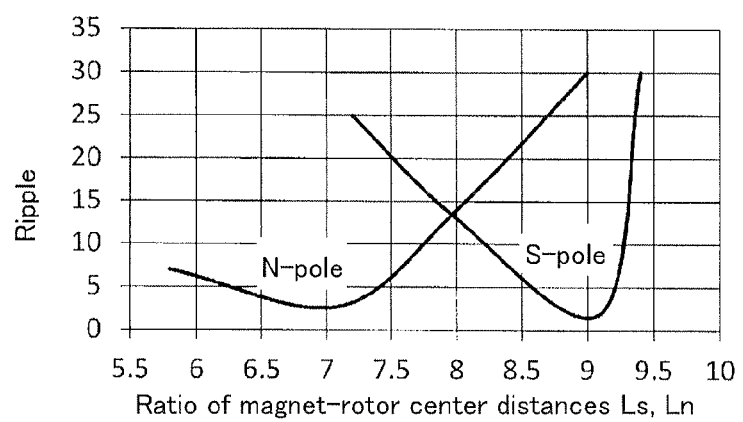
FIG. 8 is a graph showing each pole's trend in results of analysis with the use of modeFRONTIER® for combinations of distance (shortest distance) Ls, Ln between an innermost magnet of each pole and center Or of a rotor.

FIG. 8 is a graph showing each pole's trend in results of analysis with the use of modeFRONTIER® for combinations of the above-described distances Ls and Ln. As shown in FIG. 8, Ls marks a minimum value at 7, and Ln marks a minimum value at 9. It is clear from the results that, as for Ln and Ls, innermost-layer magnets 26*a* of each pole should be placed in such a way that Ls:Ln=7:9.

In general, when magnets are symmetrically disposed in a motor, the number of times cogging occurs is equal to a least common multiple of the poles and slots. Accordingly, in the case of a four-pole 24-slot motor, cogging occurs for 24 peaks per rotation of the motor. In order to reduce the cogging, some methods are available, such as applying a skew. In this case, the problem is that the torque is lowered due to effects of leakage flux. In the case of the motor 1 of the present invention, the rotor 3 is formed into an asymmetrical shape in line with (a) to (c). Therefore, the cogging is reduced as suction forces generated in each pole between the rotor and the stator are cancelled.

FIG. 9 is explanatory diagrams showing torque fluctuations when magnets are asymmetrically disposed based on the above-described settings (a) to (c) and when magnets are symmetrically disposed as before (FIG. 9A), as well as a difference in cogging torque between the above two (FIG. 9B). As shown in FIG. 9A, when magnets are asymmetrically disposed, the fluctuations in torque can be kept small. As shown in FIG. 9B, if the outcome of conventional settings is 100, the settings of the present invention can keep the cogging at 20 percent of that outcome.

The output torque of the motor 1 is a combination of reluctance torque and magnet torque. In the case of a symmetric rotor, due to fluctuations of Ld-Lq, the ripple of the reluctance torque becomes larger. In the case of the motor 1 of the present invention, the rotor is asymmetrical. Therefore, the reluctance torque that is generated in S-pole zones S1, S2 of FIG. 5, and the reluctance torque that is generated in N-pole zones N1, N2 are cancelled, leading to a reduction in the torque ripple.

FIG. 10A is an explanatory diagram showing output torque when magnets are asymmetrically disposed based on the above-described settings (a) to (c). FIG. 10B is an explanatory diagram showing output torque when magnets are symmetrically disposed as before. Incidentally, in the diagrams, the magnet torque is represented by Tm, and the reluctance torque by Tr. The output torque (total torque), which is a combination of Tm and Tr, is represented by Tt. As shown in FIG. 10A, it is clear that, when the magnets are asymmetrically disposed, the torque ripple is reduced much more than the case of FIG. 10B.

In this case, as for the ripple related to the reluctance torque, as shown in FIG. 11A, the reluctance torque Tr(A) in the A portion and the reluctance torque Tr(B) in the B portion cancel each other. As a result, the total reluctance torque Tr (combined) is far lower than that of the symmetrical structure shown in FIG. 11B.

As for the magnet torque, in the case of a symmetric rotor, an induced voltage waveform deforms as high-frequency components are superimposed on the magnetic flux, resulting in an increase in the torque ripple. In the case of an asymmetric rotor, high-frequency components are cancelled, an induced voltage waveform is turned into a sine wave, and a torque ripple of magnet torque is reduced. As described above, a method of reducing the torque ripple by transforming the induced voltage into a sine wave by skew is also available. However, in this case, the skew leads to a reduction in the torque. The asymmetric structure of the rotor of the present invention does not bring about a reduction in the torque. Therefore, the asymmetric structure is more effective than the skew in reducing the torque ripple.

FIG. 12A is an explanatory diagram showing induced voltage waveform when magnets are asymmetrically disposed based on the above-described settings (a) to (c). FIG. 12B is an explanatory diagram showing induced voltage waveform when magnets are symmetrically disposed as before. As shown in FIG. 12B, when magnets are symmetrically disposed, the induced voltage waveform deforms. When magnets are asymmetrically disposed, as shown in FIG. 12A, it is clear that the waveform is transformed into a sine wave.

(3) Rotor eccentricity

Figure 13:
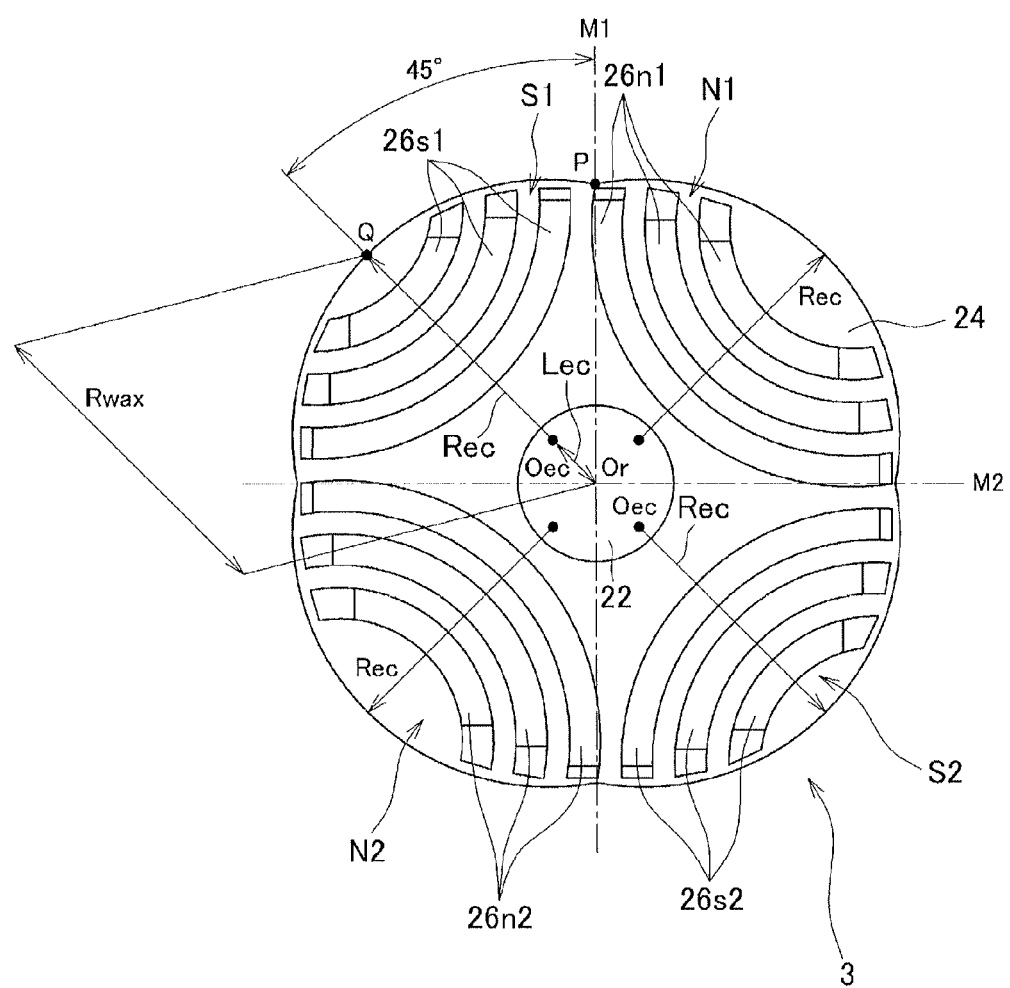
FIG. 13 is an explanatory diagram showing the eccentric configuration of a rotor.

As for the above feature (3), in the rotor 3, the torque ripple is reduced by the outer peripheral eccentric setting. FIG. 13 is an explanatory diagram showing the eccentric configuration of the rotor 3. Incidentally, in FIG. 13, in order to make clear the eccentric state of the rotor 3, the outer shape of the rotor is exaggerated. As described above, a magnet that protrudes into an adjacent zone-side region can be either of S- or N-pole. Therefore, unlike that shown in FIG. 5, FIG. 13 illustrates an N-pole magnet 26n that has lapped over into an S-pole zone.

As shown in FIG. 13, the outer periphery of the rotor 3 is not a uniform circumference of a circle around point Or. The outer periphery of the rotor 3 is made up of circular arcs each of which has a radius from a different center point for each of the four pole zones S1, S2, N1, and N2. The circular arcs are connected together at a boundary point P of each pole zone. That is, the outer periphery of each pole zone is formed as a circular arc with a radius of Rec from eccentric point, or center, Oec. The eccentric point Oec is an eccentric distance Lec away from the rotor center point Or toward a radial-direction outer side. The eccentric point Oec is located on a line segment that is tilted at 45 degrees to the center lines M1 and M2. The radius Rec is smaller than the distance Rmax between an outermost position Q of the rotor 3 and the rotor center Or.

When the outer periphery of the rotor 3 is made eccentric, the higher-frequency components of the induced voltage waveform can be further reduced. As a result, the torque ripple can be further reduced. Moreover, the eccentricity of the rotor can moderate the fluctuations in magnetic flux caused by the rotation of the rotor. As a result, the fluctuations in the magnet torque can be reduced, and the torque ripple can be reduced. FIG. 14A is an explanatory diagram showing waveform of torque when an outer periphery of a rotor is made eccentric. FIG. 14B is an explanatory diagram showing waveform of torque when an outer periphery of a rotor is not made eccentric.

As shown in FIG. 14, if the rotor 3 is set eccentric, the torque ripple, particularly the torque ripple of magnet torque Tm, can be lowered, and the ripple of the output torque Tt, too, is reduced. According to the results of experiments by the inventors, even in the case of setting "asymmetric/not eccentric", the torque ripple was far lower than that of "symmetric/not eccentric" (Torque ripple rate: reduced from 8 percent to 5 percent). In the case of setting "asymmetric/eccentric", the torque ripple was further reduced (Torque ripple rate reduced to around 3.7 percent). In general, in the case of a motor for electric power steering, it is preferred that the torque ripple be kept less than 5 percent. The setting "asymmetric/not eccentric" can roughly fulfill this criterion. However, in order to reduce both the ripples of the reluctance torque and magnet torque and to keep the total torque ripple less than 5 percent without fail, it is desirable that the outer periphery of the rotor be made eccentric.

In that manner, because of the rotor asymmetric settings of the above-described (1) to (3), the motor 1 of the present invention can reduce both the ripples of the reluctance torque and magnet torque, and can reduce the cogging. FIG. 15 is explanatory diagrams showing: a comparison between torque ripple caused by the use of a rotor in which the above-described settings (1) to (3) are used in combination, and torque ripple caused by the use of a rotor that is set as before without employing (1) to (3) (FIG. 15A); and a comparison. between torque caused by the use of a rotor in which the above-described settings (1) to (3) are used in combination, and torque caused by the use of a rotor that is set as before without employing (1) to (3) (FIG. 15B). As shown in FIG. 15, in the case of the settings of the present invention, while the torque is almost equal to that obtained by the conventional settings, the torque ripple is halved. That is, according to the present invention, it is possible to reduce the torque ripple without sacrificing the torque, compared with the conventional settings.

Incidentally, the configuration similar to that described above may be realized by disposing magnets in a different manner from the above-described first embodiment. That is, according to the first embodiment, S-pole magnets 26s are disposed around the same center point Os in layers, and N-pole magnets 26n are disposed around the same center point On in layers. Then, three-layer magnets 26 are disposed in such a way that the distance Rs between the center Os and the rotor center Or is different from the distance Rn between the center On and the rotor center Or. In this manner, magnets 26a are placed in such a way as to lap over into an adjacent pole zone, without letting the magnets 26a interfere with magnets of the other pole. However, the structures shown in FIGS. 16A and 16B are also possible.

That is, as shown in FIG. 16A, magnets 26 may be disposed in layers in such a way that radiuses of magnets in each layer are set to the same value $R_0$ and that center points of the radiuses are placed at different positions $O_1$ to $O_3$. In the case of FIG. 16A, the centers of the magnets are placed on a line segment that is tilted at 45 degrees to center lines M1 and M2, and the distances between the center points and the rotor center Or are different. As shown in FIG. 16B, magnets may be disposed in such a way that the distance between center point Os of radiuses of S-pole magnets 26s and rotor center Or is equal to the distance between center point On of radiuses of N-pole magnets 26n and rotor center Or (Distance Or–Os=distance Or–On); and that the radiuses of the magnets 26s and 26n are different from each other.

Figure 17:
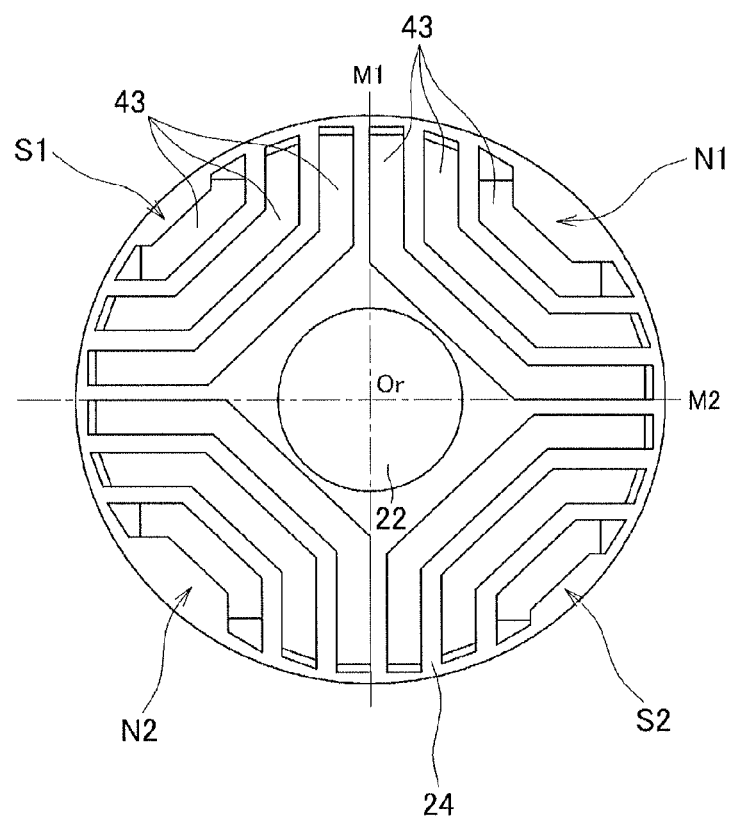
FIG. 17 is an explanatory diagram showing a modified example of magnet shape.

What is shown here as an example is the use of permanent magnets that are arc-shaped in cross-section for magnets 26 in the motor 1. Instead, as shown in FIG. 17, a magnet 43 whose cross-section is in the shape formed by three sides of an isosceles trapezoid (upper base and two oblique sides) may be used. Incidentally, as described above, placing three magnets 26 or 43 is suitable in terms of balance. However, the number is not limited to three; two or four magnets may be placed, for example.

In the above-described embodiment, what is described is an example of a brushless motor in which the inner peripheral sides of the tooth sections 13 are connected together via the bridge section 14. However, the present invention can also be applied to a brushless motor in which teeth are formed separately without a bridge section. The structure of the tooth sections 13 is not limited to the one in which the tooth sections 13 are fitted and fixed into the tooth mounting grooves 16 of the outer stator 11. The tooth sections 13 may be formed integrally with the outer stator 11.

(Second Embodiment)

Figure 18:
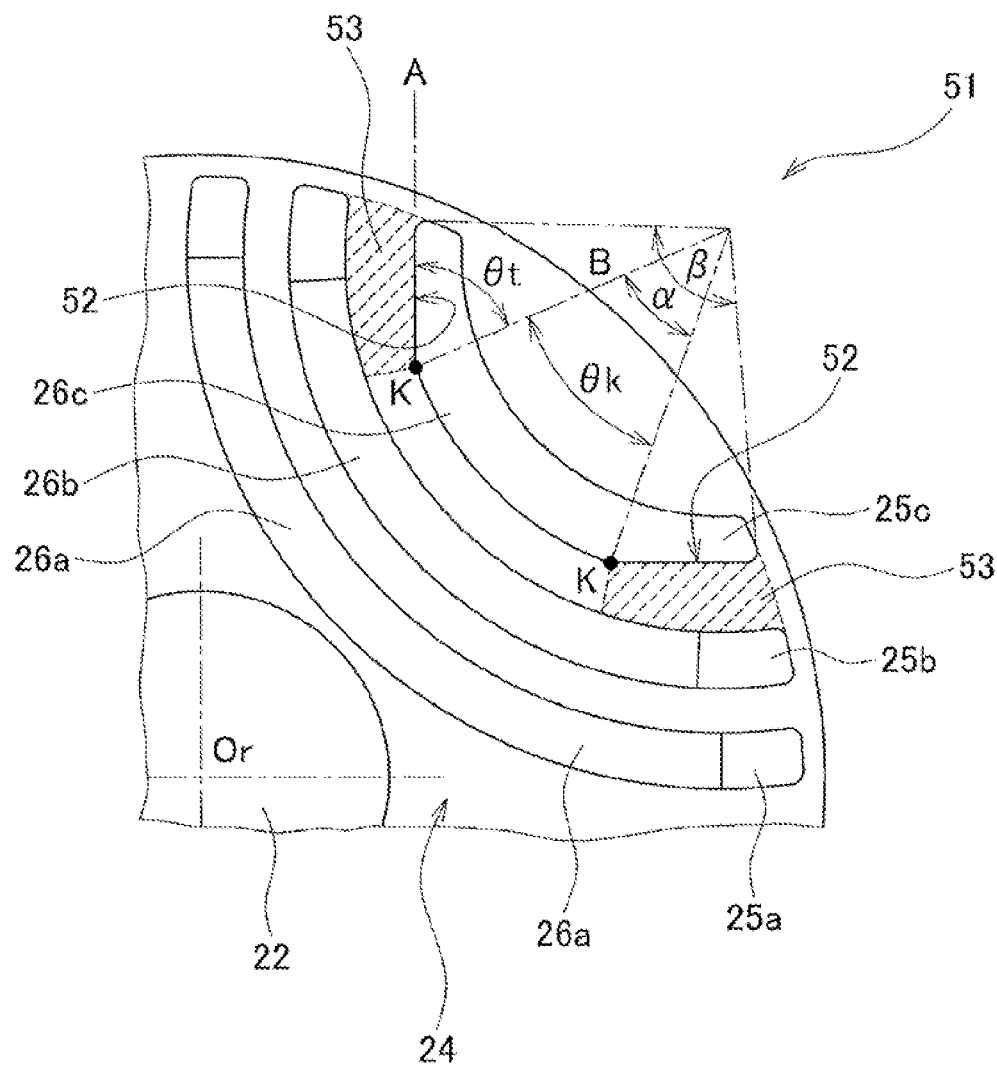
FIG. 18 is an explanatory diagram showing the configuration of a magnetic flux control section in a brushless motor according to a second embodiment of the present invention.

FIG. 18 is an explanatory diagram showing the configuration of a brushless motor 51 (simply referred to as motor 51, hereinafter) according to a second embodiment of the present invention. In addition to the above-described three features of the motor 1 of the first embodiment, a fourth feature is added to the motor 51. That is, in the case of the motor 51, in a region (an S-pole region of FIG. 5, an N-pole region of FIG. 13) where an innermost-layer magnet 26 protrudes into an adjacent pole zone of the other pole, a linear tapered section 52 is provided in an end portion of an outermost-layer slit 25. Incidentally, the same portions, members, and components as those of the first embodiment are represented by the same reference symbols, and will not be described again.

In the above-described motor 1, due to the structures of the above-described (1) to (3), a torque ripple rate upper limit (5%) for EPS motor can be met. However, the execution of maximum torque control or rotational frequency maximum control tends to leave only a little room in a low current region. Accordingly, in the case of the motor 51, in a peripheral edge portion of an outermost-layer slit 25c of the rotor 3, a linear tapered section 52 is provided, and, in an end portion of the slit, a magnetic flux control section 53 is formed in order to control the amount of magnetic flux flowing between slits 25a and 25b and further reduce the torque ripple rate.

As shown in FIG. 18, in the rotor core 24 of the motor 51, in two end portions of an outermost-layer slit 25c, tapered sections 52, which are made by turning peripheral edges of the slit 25c into a straight line, are provided. In the motor 51, magnetic flux control sections 53 are formed between the tapered sections 52 and an intermediate-layer slit 25b. The tapered sections 52 are provided outside pole arc angle α of the outermost-layer magnet 26c and inside aperture angle β of the slit 25c. That is, angle θk formed by base points K of the two tapered sections 52 is: α≤θk≤β. Incidentally, in the case of FIG. 18, θk=α. Moreover, taper angle θt formed by line A that extends along the tapered section 52 and line B at the position of an end portion of the magnet 26c is formed in such a way as to be greater than 0 degree and less than 90 degrees (0 degree<θt <90 degrees). According to the results of experiments by the inventors, θt should be about 60 degrees to 75 degrees, or more preferably about 68 degrees to 72 degrees. In the present embodiment, θt=70 degrees.

The motor 51 is designed to rotate in the forward and reverse directions for EPS. In order to carry out forward and reverse rotations in a balanced manner, the tapered sections 52 at both ends of the slit 25c are disposed symmetrically about center line Ot. That is, the base point angle θk between the two tapered sections 52 is equally divided by the center line Ot. The taper angles θt of the two tapered sections 52 are equal to each other. Incidentally, in a motor that is designed to rotate only in one direction, there is no need to provide the tapered sections 52 and form the magnetic flux control sections 53 in both end portions of the slit 25c; a tapered section 52 may be provided only on one side depending on the rotation direction. In such a case, base point K of the tapered section 52 is located outside the pole arc angle α and inside the aperture angle β as described above. However, since there is only one tapered section 52, the base point angle θk is zero.

Figures 19, 19A, 19B:
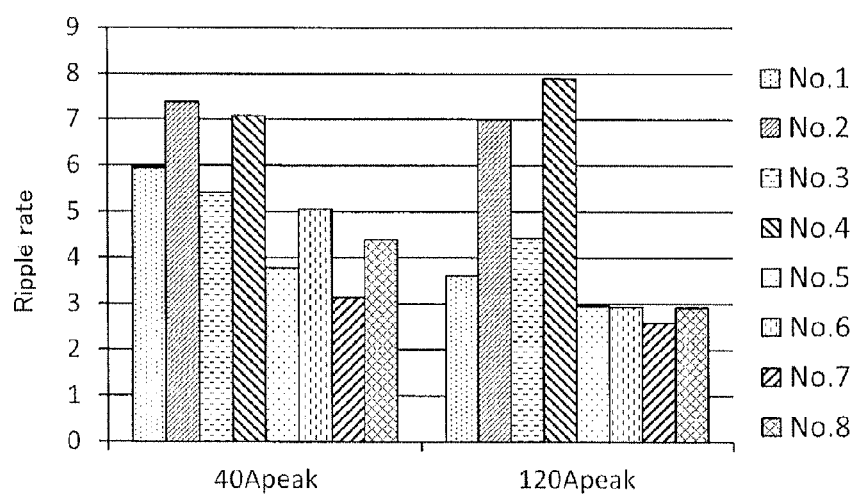
FIG. 19A is a diagram showing various types of combinations of tapered sections provided on each-layer slit.
FIG. 19B is a graph showing a comparison of torque ripple rate between the combinations.

Such tapered sections 52 may be provided not only on the outermost-layer slit 25c but on innermost-layer or intermediate-layer slits 25a or 25b. What is shown in FIG. 19 is combinations of tapered sections provided on each-layer slit 25 (FIG. 19A) and a graph showing a comparison of torque ripple rate between the combinations (FIG. 19B). As shown in FIG. 19, when tapered sections were provided on the innermost-layer slit 25a (No. 1 to No. 4), the torque ripple rate was generally high, and the torque ripple was even higher than conventional specifications (No. 8). When tapered sections were provided on the intermediate-layer slit 25b (No. 1, 2, 5, 6), while there were some in which a torque ripple reduction effect was confirmed (No. 5), it was suggested that the outermost-layer tapered sections might effective, and the outcome was not so greater than that of the conventional specifications. When tapered sections are provided only on the outermost-layer slit 25c (No. 7), regardless of whether maximum torque control or rotational frequency maximum control was carried out, the torque ripple reduction effect was large, and the torque ripple rate was kept lower than the conventional specifications.

Figure 20:
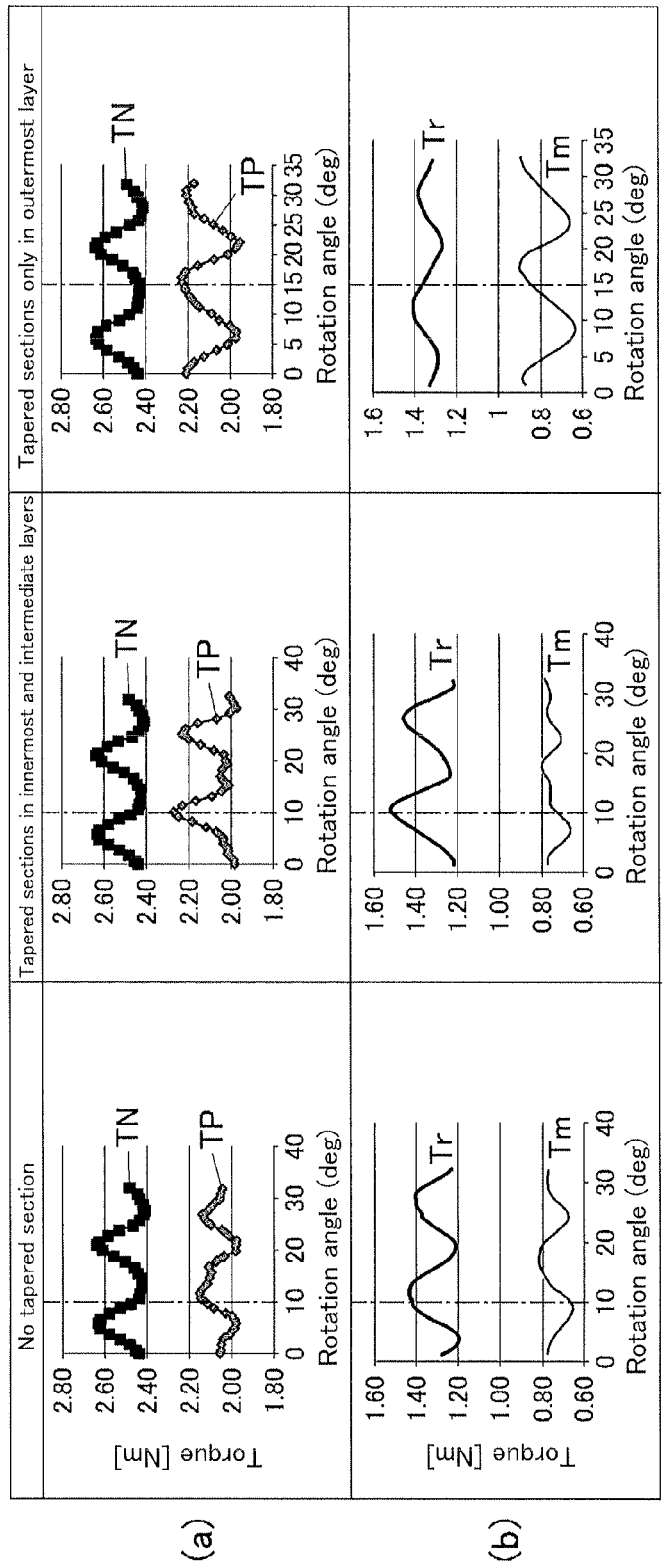
FIG. 20 is an explanatory diagram showing relation between rotation angle and torque when conventional specifications are used, when tapered sections are provided in an innermost layer and an intermediate layer, and when a tapered section is provided only in an outermost layer.

FIG. 20 is an explanatory diagram showing relation between rotation angle and torque when conventional specifications are used (with no tapered sections), when tapered sections are provided in an innermost layer and an intermediate layer, and when a tapered section is provided only in an outermost layer. In this case, FIG. 20A shows the torque at each site. In the diagram, TP represents fluctuations in torque at a site where a tapered section 52 is provided (magnet overlap side), and NT represents fluctuations in torque at a site where no tapered section 52 is provided. FIG. 20B shows the torque at the TP site, which is separated into reluctance torque Tr and magnet torque Tm.

In FIG. 20A, take a look at a peak of torque at the TP site. If the tapered sections are provided in the innermost and intermediate layers, the torque is amplified at the TP and NT sites. If the tapered section is provided only in the outermost layer, the torque is cancelled at the TP and NT sites. As shown in FIG. 20B, the phase of Tr is changed greatly in each case; it is clear that a change in the torque waveform in FIG. 20A is chiefly due to a change in the phase of Tr. That is, if the tapered sections 52 are provided and the magnetic flux magnetic control sections 53 are formed, the magnetic flux density distribution at the TP site is changed, resulting in a change in the phase of Tr. As a result, the peaks of torque are cancelled between the TP and NT sites, leading to a reduction in the torque ripple.

Figure 22:
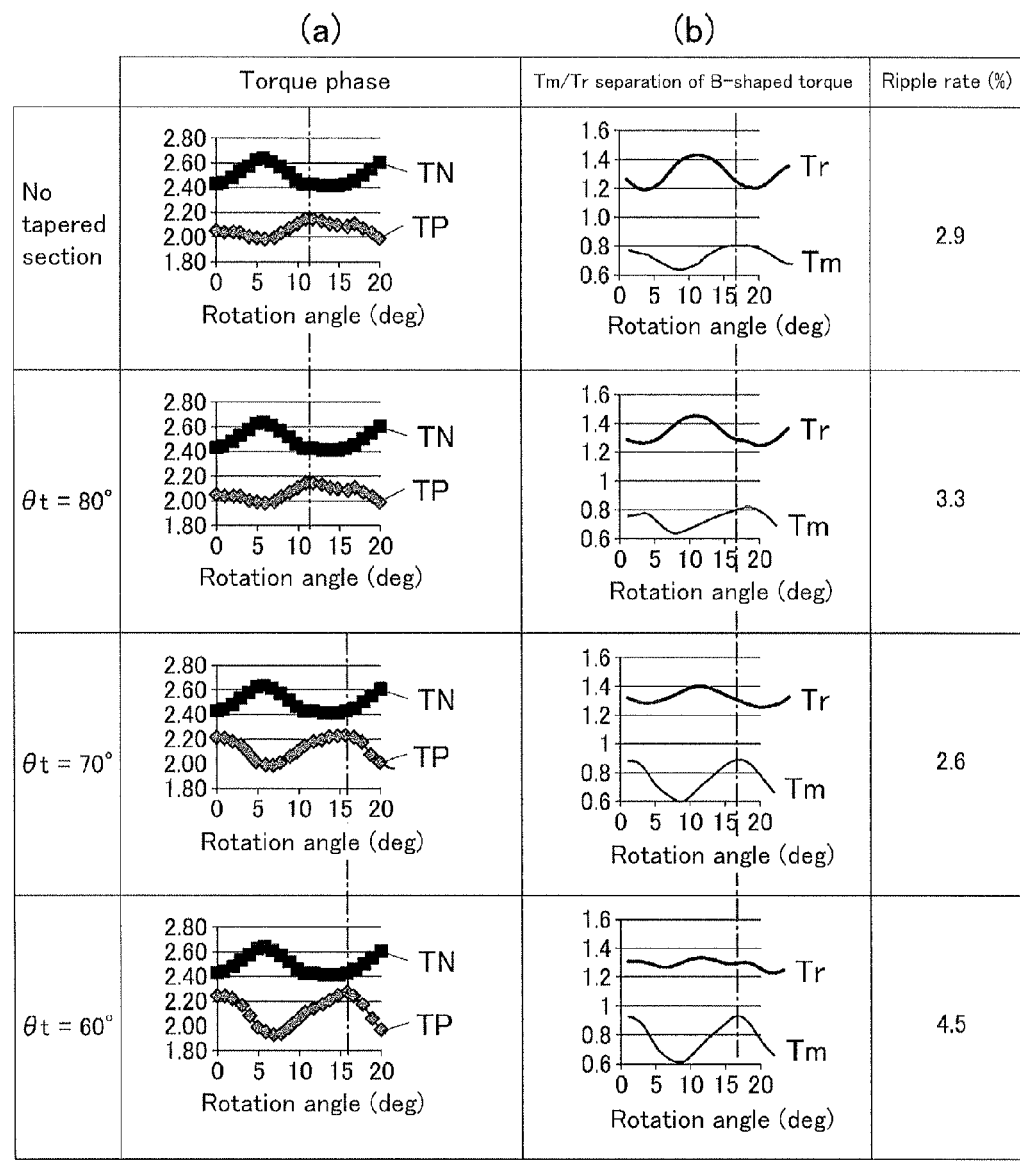
FIG. 22 is an explanatory diagram showing relation between rotation angle and torque when conventional specifications are used and when taper angle θt is 60, 70, or 80 degrees.

As for the taper angle θt, if the tapered sections 52 are provided on the outermost-layer slit 25c, and if θt is set at about between 60 degrees and 75 degrees, or preferably between 68 degrees and 72 degrees, the torque ripple rate is lower than the conventional specifications. FIG. 21 is a graph showing the results of experiments by the inventors. In this case, the conventional specifications are compared with the case where θt is set at 60, 70, or 80 degrees (FIG. 21A is for maximum torque control, and FIG. 21B is for rotational frequency maximum control). As can be seen from FIG. 21, in the maximum torque control and the rotational frequency maximum control, the case where θt is set at 70 degrees is most well-balanced with a low torque ripple rate from the low current region to the high current region. As in the case described above, in terms of torque change at TP and NT sites, as shown in FIG. 22A, a maximum torque rotation angle at the TP site is shifted, in the case where θt is equal to 70 or 60 degrees, to 16 degrees from 10 degrees, which is the same value as that of the conventional specifications. As shown in FIG. 22B, if θt is set to 70 or 60 degrees, the peak torque of Tm becomes larger. This change in the peak torque leads to a shift in the maximum torque rotation angle at the TP site, and the peaks of torque are cancelled between the TP and NT sites. Therefore, the torque ripple can be reduced by setting θt at about between 60 degrees and 75 degrees.

Figure 23:
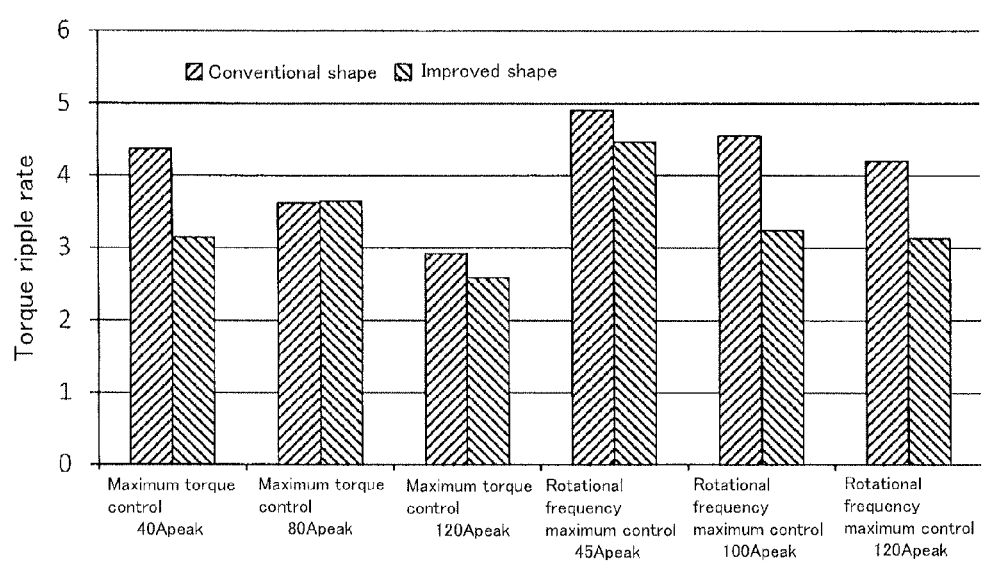
FIG. 23 is an explanatory diagram showing torque ripple rates when, in a magnet-assisted reluctance motor of the present invention, maximum torque control or rotational frequency maximum control is carried out.

In that manner, the motor 51 of the present invention can reduce the torque ripple by employing the rotor asymmetric settings (1) to (3) of the first embodiment and the tapered sections 52 of (4). FIG. 23 is an explanatory diagram showing a comparison of torque ripple rate between when a rotor in which the above-described settings (1) to (4) are used in combination is used and when a rotor that is set as before without the settings (1) to (4) is used. As shown in FIG. 23, in the case of the settings of the present invention, during the maximum torque control or the rotational frequency maximum control, the torque ripple in the low current region is reduced, thereby giving the upper limit a greater margin than the conventional settings.

(Third Embodiment)

Figure 24:
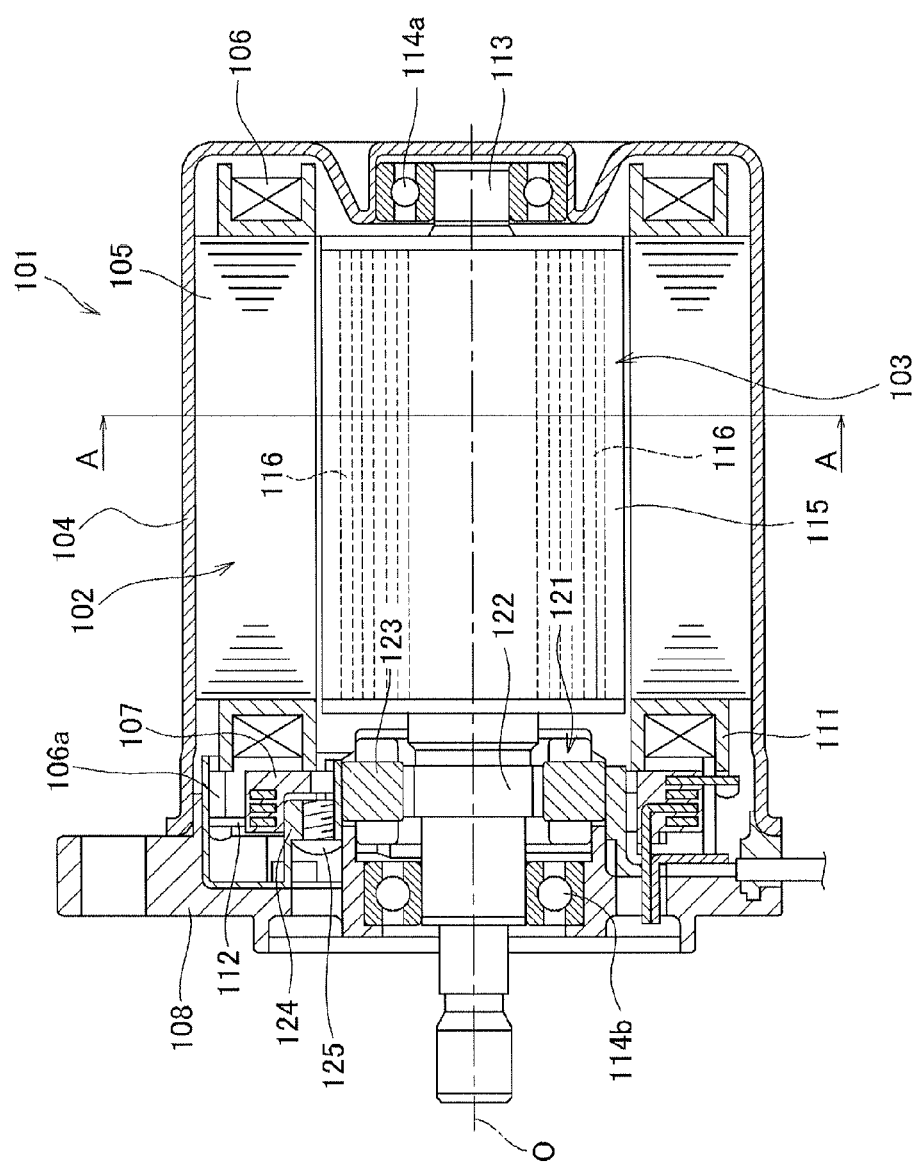
FIG. 24 is a cross-sectional view of a brushless motor according to a third embodiment of the present invention.
Figure 25:
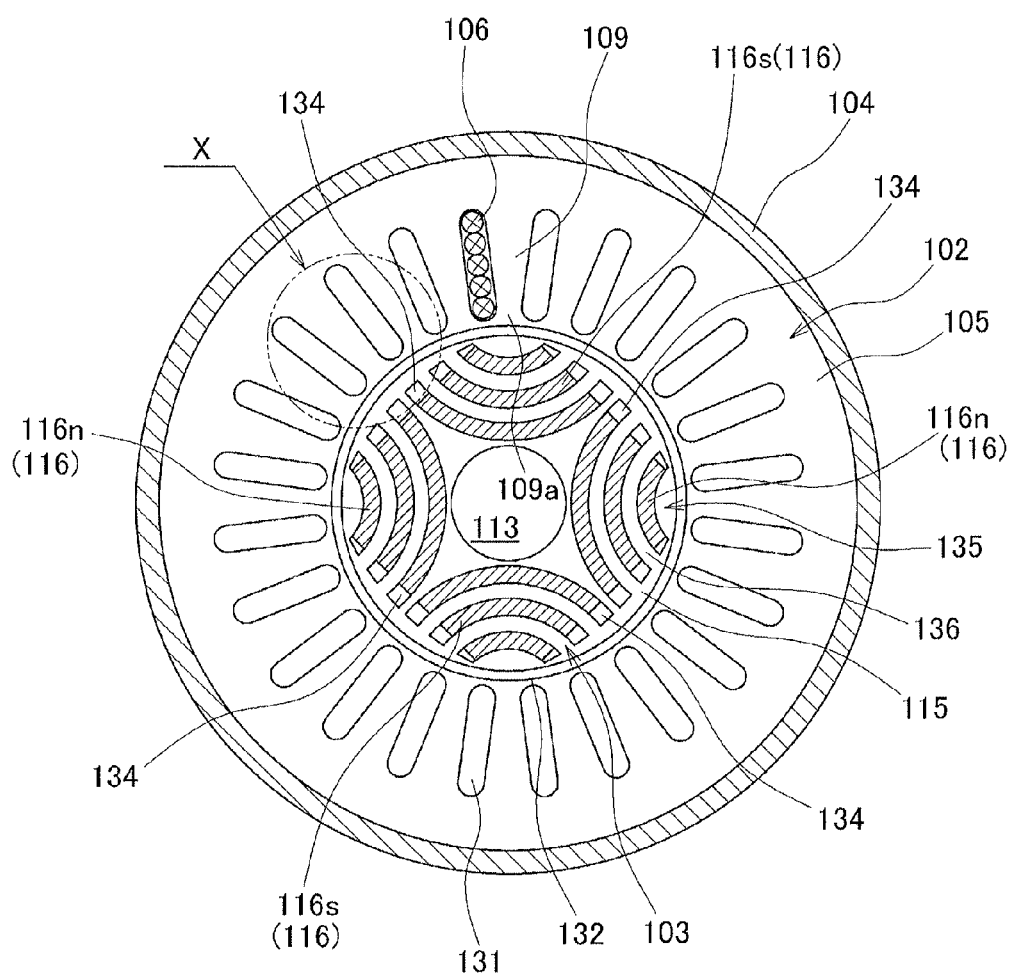
FIG. 25 is a cross-sectional view of FIG. 24 taken along line A-A.

FIG. 24 is a cross-sectional view of a brushless motor 101 (simply referred to as motor 101, hereinafter) according to a third embodiment of the present invention. FIG. 25 is a cross-sectional view of FIG. 24 taken along line A-A. The motor 101, too, is a magnet-assisted reluctance motor that is based on a reluctance motor and uses assistance of a magnetic force of a magnet disposed in a rotor. For example, the motor 101 is used as a drive source for an electric power steering device. As shown in FIG. 24, the motor 101 is a brushless motor of an inner rotor type in which, as in the case of a typical reluctance motor, a stator (Stator) 102 is located on the outer side and a rotor (Rotor) 103 is on the inner side.

The stator 102 is fixed to the inner side of a motor casing 104 (simply referred to as casing 104, hereinafter) of a bottomed cylindrical shape. The stator 102 includes a stator core 105; a stator coil 106 (simply referred to as coil 106, hereinafter), which is wound around tooth sections 109 of the stator core 105; and a bus bar unit (terminal unit) 107, which is attached to the stator core 105 and electrically connected to the coil 106. The casing 104 is made of iron or the like and formed into a bottomed cylindrical shape. In an opening of the casing 104, with fixing screws, not shown, a bracket 108 made by aluminum die-casting is attached.

The stator core 105 is formed by stacking steel plates (e.g., magnetic steel sheets). On the stator core 105, a plurality of tooth sections 109 are provided in such a way as to protrude toward a radial-direction inner side. Between the adjacent tooth sections 109, slots 131 are formed. Inside the slots 131, a coil 106 is housed in a distributed winding pattern. On the stator core 105, an insulator 111, which is made of synthetic resin, is attached. Around the outer side of the insulator 111, the coil 106 is wound.

Figure 26:
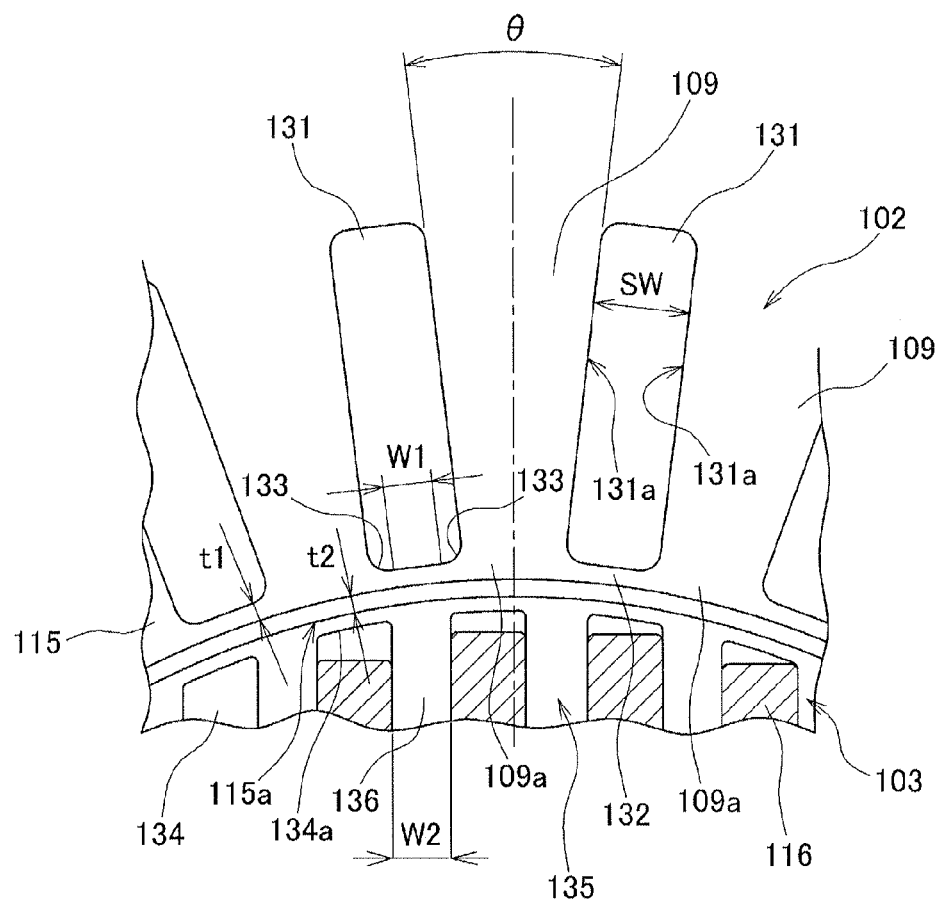
FIG. 26 is an explanatory diagram showing the configuration of an X portion in FIG. 25.

FIG. 26 is an enlarged view of portions of the tooth sections 109, or an X portion of FIG. 25. As shown in FIG. 26, on the inner peripheral sides of the tooth sections 109, a bridge section 132 is provided in such a way as to connect adjacent tooth tip portions 109a together. On the bridge section 132, in order to make it easier for stator-side magnetic flux to flow and make press working easier, chamfered sections 133 (R- or C-chamfered) are provided between the bridge section 132 and the tooth tip portions 109a. Radial-direction width t1 of the bridge section 132 is set to almost the same value as the sheet thickness of the magnetic steel sheets that make up the stator core 105. Incidentally, the reason why the coil 106 is in a distributed winding pattern as described above is because the distributed winding pattern can keep the leak of magnetic flux in the bridge section 132 lower than a concentrated winding pattern, and make a maximum torque larger than the concentrated winding pattern.

Moreover, circumferential-direction width B of the tooth sections 109 become narrower toward the tip portions. The tooth sections 109 overall are fan-shaped with center angle θ. Accordingly, in the slots 131, circumferential-direction inner surfaces 131a that face each other are parallel to each other along the radial direction. In a conventional magnet-assisted reluctance motor, teeth are formed into a straight shape with an equal width, and slots are fan-shaped. Therefore, when a winding is housed in a slot, as shown in FIG. 27A, the coil cannot be neatly placed; when the coil is welded, an insulation failure could occur as parts of the coil rub against each other. Especially when the tooth inner peripheral sides are connected together as in the case of the motor 101, the coiling by a winding machine is difficult. Therefore, a method of inserting a thick coil into a slot and then welding parts of the coil together is employed. However, in the case of this motor, the coil needs to be twisted when being welded. If there is play in the coil inside the slot, parts of the coil could rub against each other, possibly hurting a film that covers the coil.

In the case of the motor 101, the inner surfaces 131a of the slots 131 are parallel to each other. Therefore, as shown in FIG. 27B, the thick coil 106 can be neatly placed in the slot 131. Moreover, width SW of the slot 131 is set almost equal to (or slightly larger than) the thickness of a wire of the coil 106. Therefore, the coil 106 is placed in the slot 131 with almost no play. Therefore, even if the coil is twisted before being welded, the coil is unlikely to move freely, thereby reducing the possibility that parts of the coil would rub against each other. In this manner, this configuration prevents damage to the film of the coil, and contributes to an improvement in the insulation performance of the coil.

Figure 29:
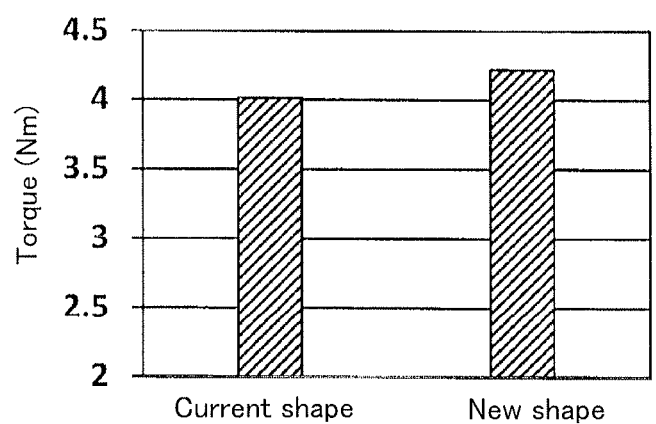
FIG. 29 is an explanatory diagram showing a comparison between an average torque of a conventional motor and an average torque of a motor of the present invention based on the experiment results of FIG. 28.

In the motor 101, as described above, the bases of the tooth sections 109 are wide. Therefore, the magnetic flux flows smoothly in the teeth, and a magnetic flux saturation is unlikely to occur in the tooth sections. Moreover, compared with the case where the teeth are formed into a straight shape, the space of a back core portion in the stator core 105 becomes wider. As a result, the magnetic resistance is reduced, and the torque can be increased compared with a motor of the same physical structure. FIG. 28 is a graph showing results of experiments by the inventors. FIG. 29 is an explanatory diagram showing a comparison between an average torque of a conventional motor and an average torque of a motor of the present invention based on the experiment results. As can be seen from FIGS. 28 and 23, the motor of the present invention features improved torque compared with the conventional motor, and the average torque is about 5 percent higher than that of the conventional motor.

On a one end side of the stator core 105, the bus bar unit 107 is mounted. The bus bar unit 107 is made by insert molding of a bus bar, which is made of copper, into a main body made of synthetic resin. Around the bus bar unit 107, a plurality of power supply terminals 112 are provided in such a way as to protrude in the radial direction. When the bus bar unit 107 is to be mounted, to the power supply terminals 112, ends 106a of coils 106, which are pulled out from the stator core 105, are welded. The number of bus bars provided in the bus bar unit 107 matches the number of phases of the motor 101 (In this case, a total of four bas bars are provided, with three for three phases, U-phase, V-phase, and W-phase, and one for connection between the phases). Each coil 106 is electrically connected to a power supply terminal 112 corresponding to the phase thereof. After the bus bar unit 107 is mounted, the stator core 105 is pressed and fixed into the casing 4.

Inside the stator 102, the rotor 103 is inserted. The rotor 103 includes a rotor shaft 113. The rotor shaft 113 is supported by bearings 114a and 114b in a rotatable manner. The bearing 114a is fixed to the center of a bottom portion of the casing 4. The bearing 114b is fixed to a central portion of the bracket 108. To the rotor shaft 113, a cylindrical rotor core 115 and a rotor (resolver rotor) 122 of a resolver 121, which is a rotational angle detection means, are attached. A stator (resolver stator) 123 of the resolver 121 is housed in a resolver bracket 124, which is made of synthetic resin. The resolver bracket 124 is fixed to the inner side of the bracket 108 with an attachment screw 125.

The rotor core 115, too, is made by stacking a large number of disk-shaped magnetic steel sheets. On the steel sheets that make up the rotor core 115, a plurality of slits 134 are provided as magnet mounting holes. The slits 134 are curved into an arc. There is space inside the slits 134. The slits 134 are provided along a circular arc whose center is an imaginary point (not shown) set outside an outer periphery of the rotor 103. Each of the slits 134 is formed in the rotor in such a way that a convex-side portion thereof faces the center of the rotor 103. Width t2 between an outer diameter-side end portion 134a of a slit 134 and an outer peripheral edge 115a of the rotor core 115 is set almost equal to the sheet thickness of the magnetic steel sheets.

If the direction of magnetic flux formed by magnetic poles (or central axis of permanent magnets) is referred to as d-axis, and if the axis that is magnetically orthogonal to d-axis (axis between permanent magnets) is set as q-axis, a plurality of sets of slits 134 are provided, with q-axis, which is perpendicular to the rotor shaft 113, as a boundary. In the motor 101, four sets of a plurality of slits 134 are provided in an arc shape. In each set, a plurality of layers of magnetic paths are formed.

In the motor 101, in order to increase the output, a plurality of magnets (permanent magnets) 116 are embedded in the slits 134. In an area of each magnet 116, a magnetic pole section 135 is formed along the circumferential direction. In the motor 101, the reluctance torque is regarded as main force, and the magnet torque as auxiliary force. Accordingly, inexpensive ferrite magnets are used as magnets 116. However, in order to further increase the output, neodymium bonded magnets or other rare-earth magnets may be used as magnets 116.

In the rotor 103, as a plurality of magnets 116 that make up the magnetic pole sections 135, magnets 116s whose outer peripheral sides serve as S-poles, and magnets 116n whose outer peripheral sides serve as N-poles, are provided. The rotor 103 has a four-pole structure with four magnetic pole sections 135, and the motor 101 is so formed as to have a four-pole 24-slot structure. The magnets 116 of each pole are formed into a circular arc, and sets of three magnets are provided along the radial direction. A plurality of d-axes and q-axes are provided alternately in the circumferential direction on the rotor 103. Therefore, it is possible to strengthen the torque with the help of the magnet torque, while making effective use of the reluctance torque.

In the rotor 103, as described above, the direction of magnetic flux formed by magnetic poles is referred to as d-axis, and the axis that is magnetically orthogonal to d-axis is regarded as q-axis. In the rotor 103, a plurality of d-axes and q-axes are set. In this case, d-axes and q-axes are alternately provided along the circumferential direction. In the rotor 103, in order to make it easier for q-axis magnetic flux to pass, arc-shaped slits 134 are provided. In the slits 134, arc-shaped magnets 116 are embedded. That is, the rotor 103 is formed in such a way as to make it easier for q-axis magnetic flux to pass and to increase inductance Lq. Therefore, it is possible to increase the magnet torque caused by the magnets 116 and to obtain sufficient torque even with ferrite magnets.

In the motor 101, the relation between circumferential-direction width W1 of the stator-side bridge section 132 and distance W2 between the slits 134 of the rotor core 115 is set in such a way that W1≤W2. In this case, W1 represents the distance between tips of the two chamfered sections 133 of a bridge section 132. W2 is the distance between the adjacent slits 134 within the same pole, or circumferential-direction length of a magnetic path section 136 formed between the slits 134. Since the motor 101 has a closed stator structure, fluctuations in the reluctance torque are cancelled, and the torque ripple is therefore kept relatively low. Moreover, the dimensions of the motor 101 are set in such a way that W1≤W2, i.e. the stator-side bridge section 132 is set in such a way as not to be wider than the rotor-side magnetic path section 136. As a result, the fluctuations in the reluctance torque become mild, and the torque ripple is further reduced.

Figure 30:
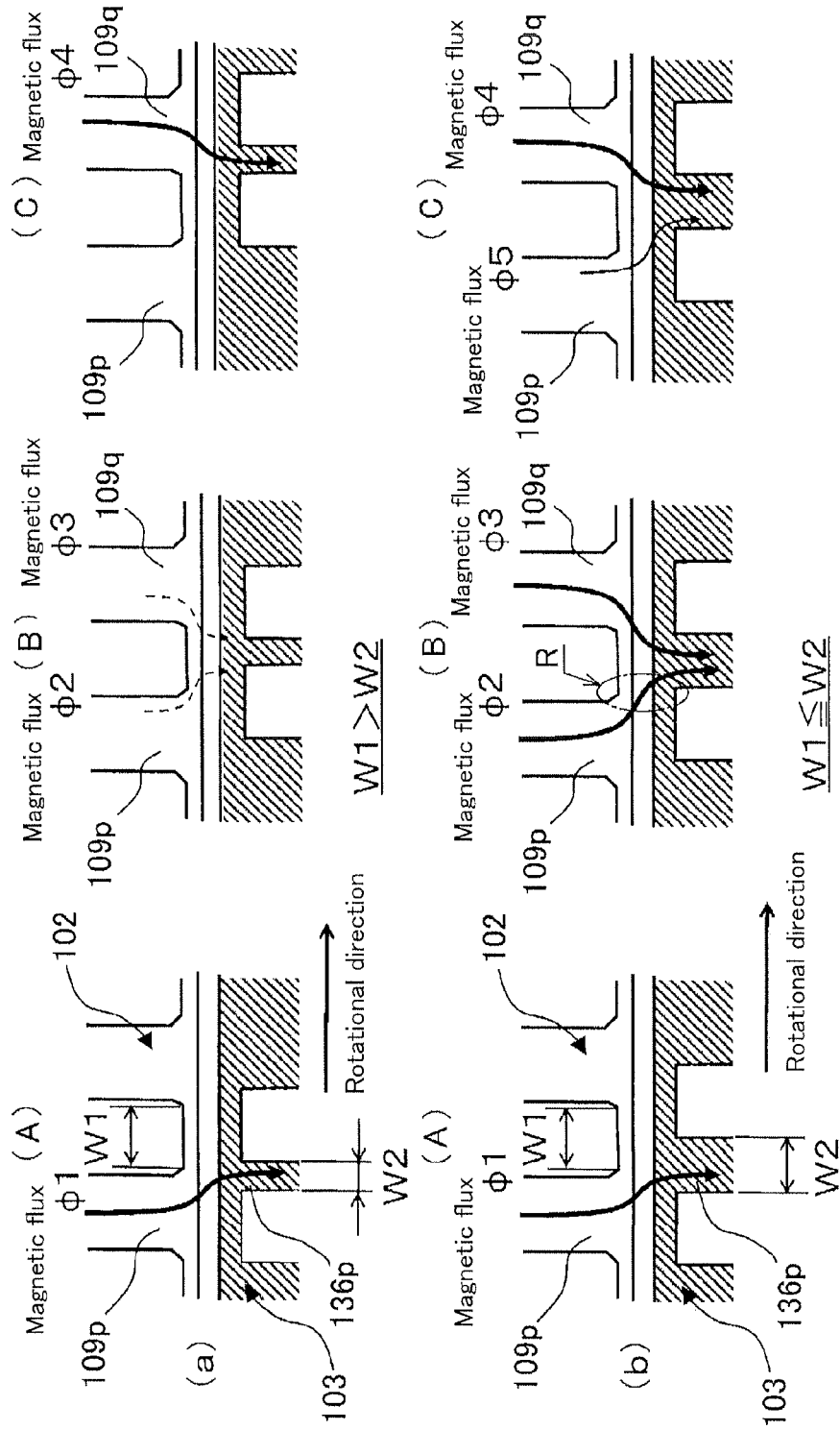
FIG. 30 is an explanatory diagram illustrating a torque ripple reduction operation according to the present invention.

FIG. 30 is an explanatory diagram illustrating a torque ripple reduction operation according to the above settings based on the present invention. FIG. 30A shows the case where W1>W2. FIG. 30B shows the case where W1<W2, as in the case of the present invention. As shown in FIG. 30A, if W1 and W2 are set in such a way that W1>W2, when state A emerges after the rotor 103 is rotated, a magnetic path section 136p of the rotor 103 is closer to a left tooth section 109p that the magnetic path section 136p is facing. Therefore, due to magnetic flux φ1 that flows through the magnetic path section 136p from the tooth section 109p, reluctance torque is generated in a direction opposite to the direction of the rotation. Then, when state (B) emerges after the rotor 103 is rotated (or the state where the center of the rotor-side magnetic path section 136 meets the center of the stator-side bridge section 132, and the two exactly face each other), magnetic flux φ2 plunges due to an increase in the magnetic resistance, and right-side magnetic flux φ3, which cancels the magnetic flux φ2, becomes smaller, too. Even though a change in the amount of magnetic flux is improved by the closed stator structure, the reluctance torque becomes rapidly smaller between (A) and (B).

When the state (C) emerges after the rotor 103 is further rotated, then the magnetic path section 136p is closer to a right tooth section 109p. Therefore, magnetic flux φ4 that flows from the tooth section 109p to the magnetic path section 136p becomes rapidly larger, and reluctance torque is generated in the same direction (forward direction) as the rotational direction. That is, when W1>W2, (A) the reverse-direction reluctance torque is generated→(B) the reluctance torque plunges→(C) the forward-direction reluctance torque is generated. In this manner, the direction and magnitude of the reluctance torque change rapidly. Therefore, while being suppressed by the closed stator structure, the occurrence of the torque ripple is inevitable due to a rapid change in the reluctance torque.

In contrast to this, as shown in FIG. 30B, when W1 and W2 are set in such a way that W1≤W2, the reluctance torque is generated in a direction opposite to the rotational direction due to magnetic flux φ1 in the state (A), as in the case (a). When the state (B) emerges as the rotor 103 is rotated, a facing portion R exists between a tip portion of a tooth section 109 and a magnetic path section 136p of the rotor 103 because W2 is larger than W1 in this case. Accordingly, the magnetic resistance does not drop rapidly, and the magnetic flux φ2 and φ3 are larger compared with the case (a). That is, the magnetic flux entering the portion in the closed stator structure is effectively utilized, the left magnetic flux φ2 and the right magnetic flux φ3 are mildly cancelled by each other, while a change in the amount of magnetic flux is suppressed.

When the state (C) emerges after the rotor 103 is further rotated, as in the case (a), magnetic flux φ4 is generated. At the same time, magnetic flux φ5 that flows from the tooth section 109p to the magnetic path section 136p remains.

Figure 31:
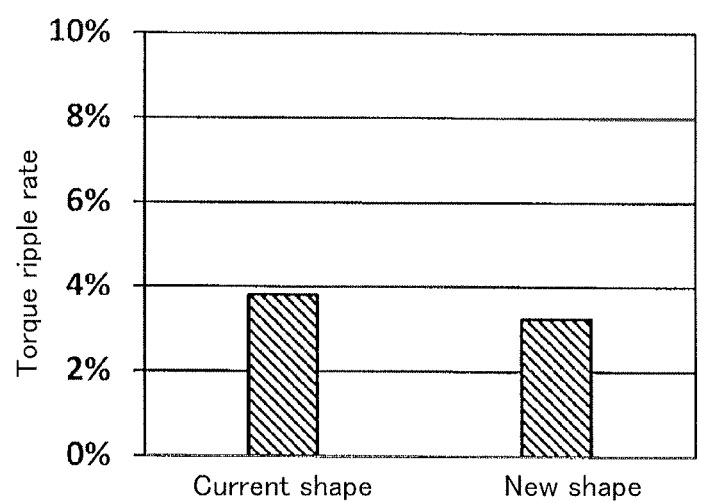
FIG. 31 is an explanatory diagram showing a comparison between a torque ripple of a conventional motor and a torque ripple of a motor of the present invention based on the experiment results of FIG. 28.

Therefore, while being cancelled by the magnetic flux φ5, the magnetic flux φ4 continues to increase, thereby mildly generating forward-direction reluctance torque. That is, even when W1≤W2, (A) the reverse-direction reluctance torque is generated→(B) the reluctance torque decreases→(C) the forward-direction reluctance torque is generated. However, the left magnetic flux appropriately cancels the right magnetic flux, leading to a mild change in the direction and magnitude of the reluctance torque. Therefore, the rapid change in the reluctance torque that could occur as described in (a) can be suppressed, resulting in a reduction in the torque ripple. FIG. 31 is an explanatory diagram showing results of experiments by the inventors (compared with the ripples in FIG. 28). As can be seen from FIG. 31, the motor of the present invention can keep the torque ripple lower than a conventional motor.

Incidentally, circumferential-direction width W1 of the bridge section 132 may range from zero, or when the chamfered sections 133 that face each other are seamlessly connected together, to a value equal to the distance between the adjacent tooth tip portions 109a (if no chamfered sections 133 are provided).

The present invention is not limited to the above embodiments. Needless to say, various changes may be made without departing from the spirit of the invention.

For example, the configurations of the above first and second embodiments can also be applied to the motor 101 of the third embodiment, or the configuration of the above third embodiment can be applied to the motors 1 and 51 of the first and second embodiments.

Figure 32:
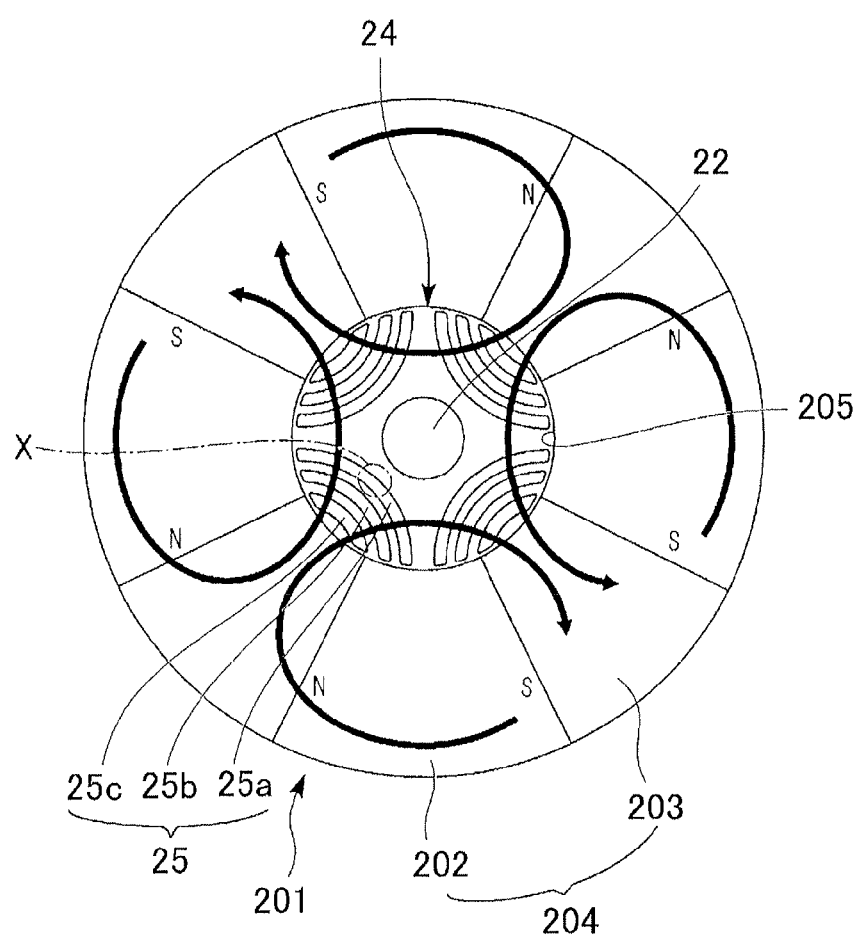
FIG. 32 is an explanatory diagram showing the configuration of a rotor production device when bonded magnets are used as magnets.

As the magnets 26 or 116, bonded or sintered magnets can be used. For example, if the bonded magnets are to be used as magnets 26, a melted magnetic molding material is poured into a slit 25, and a bonded magnetic body is molded inside the slit 25 by cooling the material. During the process, in order to have the molecules of the magnetic molding material oriented in the same direction, as shown in FIG. 32, a rotor core 24 is placed inside a rotor production device 201, and the magnetic molding material is poured into slits 25. The rotor production device 201 includes a field system means 204 in which field-system magnets 202 and magnetic cores 203 are alternately disposed in the circumferential direction. The magnetic flux that is generated from the field-system magnets 202 adjacent in the circumferential direction is concentrated on the magnetic cores 203 located between the field-system magnets 202, before extending toward a radial-direction inner side. Accordingly, a magnetic field of high magnetic flux can be generated inside a rotor housing section 205. Therefore, it is possible to generate, in a region X near the radial-direction inner side of the rotor core 24, a magnetic field of about 1 (T), which is required to have the molecules of the magnetic material oriented in the same direction.

Accordingly, to the rotor core 24 that is housed in the field system means 204, the magnetic field can be applied across the entire region in the radial direction. When the magnetic molding material of the bonded magnetic body is poured into each slit 25, it is possible to have the molecules of the bonded magnetic body oriented in the same direction in the entire radial-direction region. Therefore, when the bonded magnetic body is magnetized after the molecules are oriented, it is possible to provide a magnet 26 with a desired magnetic force. In this case, even in a rotor of a multilayer IPM structure like the one described in the present embodiment, the molecules can be reliably oriented in the same direction even for a bonded magnetic body that is poured into a slit 25 located in a radial-direction innermost layer.

Accordingly, it is possible to suppress the variation of the magnetic force between the magnets 26 formed in the slits 25.

Furthermore, the brushless motor of the present invention can be applied not only to an electric power steering device but to other electric machinery or equipment in hybrid or electric cars or the like.

EXPLANATION OF REFERENCE SYMBOLS

1: Brushless motor
2: Stator
3: Rotor
4: Motor casing
4a: Bottom section
5: Stator core
6: Stator coil
6a: End
7: Bus bar unit
8: Bracket
11: Outer stator
12: Inner stator
13: Tooth section
14: Bridge section
15: Slot
16: Tooth mounting groove
17: Fitting section
21: Power supply terminal
22: Rotor shaft
23a, 23b: Bearing
24: Rotor core
25: Slit (mounting hole)
25a to 25c: Slit
26: Magnet
26a: Innermost layer magnet
26b: Intermediate layer magnet
26c: Outermost layer magnet
26n: N-pole magnet
26s: S-pole magnet
31: Resolver
32: Resolver rotor
33: Cover
34: Control board
35: Control board
36: Power system element
37: Control system element
38: Resolver stator
41: Outer peripheral portion
42: Space
43: Magnet
51: Brushless motor
52: Tapered section
53: Magnetic flux control section
M1, M2: Center line
N1, N2: N-pole zone
S1, S2: S-pole zone
Os: S-pole magnet center point
On: N-pole magnet center point
Or: Rotor center point
Rs: Magnet center distance (Os–Or)
Rn: Magnet center distance (On–Or)
Ls: Innermost layer magnet distance
Ln: Innermost layer magnet distance
Oec: Eccentric point
Lec: Eccentric distance
P: Boundary point
Q: Outermost position Rec: Eccentric radius
Rmax: Rotor outermost position distance (Q–Or)
Tr: Reluctance torque
Tm: Magnet torque
Tt: Output torque
101: Brushless motor
102: Stator
103: Rotor
104: Motor casing
105: Stator core
106: Stator coil
106a: End of coil
107: Bus bar unit
108: Bracket
109: Tooth section
109a: Tooth tip portion
109p, 109q: Tooth section
111: Insulator
112: Power supply terminal
113: Rotor shaft
114a, 114b: Bearing
115: Rotor core
115a: Outer peripheral edge
116: Magnet
116n: N-pole magnet
116s: S-pole magnet
121: Resolver
122: Resolver rotor
123: Resolver stator
124: Resolver bracket
125: Attachment screw
131: Slot
131a: Inner surface
132: Bridge section
133: Chamfered section
134: Slit
134a: Outer diameter-side end portion
135: Magnetic pole section
136: Magnetic path section
136p: Magnetic path section
R: Facing portion
W1: Circumferential-direction length of bridge section
W2: Distance between slits in magnetic pole sections of the same polarity
t1: Radial-direction width of bridge section
t2: Width between outer diameter-side end portion of slit and rotor core outer peripheral edge 15a
θ: Tooth section center angle
201: Rotor production device
202: Field-system magnet
203: Magnetic core
204: Field system means
205: Rotor housing section

The invention claimed is:

1. A brushless motor that includes a stator that includes windings of a plurality of phases, and a rotor that is disposed inside the stator in a rotatable manner and which includes a plurality of internal mounting holes in which a plurality of permanent magnets are embedded, wherein a direction of magnetic flux formed by each of magnetic poles of the plurality of permanent magnets is set as d-axis, an axis that is magnetically orthogonal to d-axis is set as q-axis, a plurality of the d- and q-axes are alternately provided in a circumferential direction on the rotor, and the rotor is rotated by reluctance torque generated by a difference in magnetic resistance between the d-axis and q-axis directions and by magnet torque generated by the permanent magnets, the brushless motor wherein:

the plurality of permanent magnets include permanent magnets that are arc-shaped in cross-section and form a first magnetic pole which is N- or S-pole, and permanent magnets that are arc-shaped in cross-section and form a second magnetic pole that is different in polarity from the first magnetic pole;

each of the permanent magnets that form the first and second magnetic poles is embedded in the rotor in such a way that a convex side portion thereof faces a center of the rotor; and when a cross section of the rotor is equally divided into regions to which each of the d-axes belongs with respect to each of the d-axes of the first and second magnetic poles, the permanent magnets of the first magnetic pole side are disposed in such a way as to protrude into a region of the second magnetic pole side without interfering with the permanent magnets of the second magnetic pole side.

2. The brushless motor according to claim 1, wherein:
a plurality of permanent magnets that form the first and second magnetic poles are embedded in the rotor;
the permanent magnets that form the first magnetic pole are disposed in layers around a common first center point that is located outside the rotor;
the permanent magnets that form the second magnetic pole are disposed in layers around a common second center point that is located outside the rotor; and
the first and second center points are disposed in such a way that a distance between the first center point and a rotation center of the rotor is different from a distance between the second center point and the rotation center of the rotor.

3. The brushless motor according to claim 2, wherein:
when the number of the magnetic poles is four, a ratio of distance (Rs) between the first center point and the rotation center of the rotor to distance (Rn) between the second center point and the rotation center of the rotor is 0.92 (Rs/Rn=0.92).

4. The brushless motor according to claim 1, wherein:
a plurality of permanent magnets that form the first and second magnetic poles are embedded in the rotor;
a plurality of the permanent magnets that form the first magnetic pole have the same radius as a plurality of the permanent magnets that form the second magnetic pole, and the permanent magnets are disposed around different center positions that are located outside the rotor; and
centers of radiuses of the permanent magnets are disposed in such a way that a distance between the center of the radius of the permanent magnets that form the first magnetic pole and the rotation center of the rotor is different from a distance between the center of the radius of the permanent magnets that form the second magnetic pole and the rotation center of the rotor.

5. The brushless motor according to claim 1, wherein:
a plurality of permanent magnets that form the first and second magnetic poles are embedded in the rotor;
the permanent magnets that form the first magnetic pole are disposed in layers around a common first center point that is located outside the rotor;
the permanent magnets that form the second magnetic pole are disposed in layers around a common second center point that is located outside the rotor; and the first and second center points are disposed in such a way that a distance between the first center point and a rotation center of the rotor is equal to a distance between the second center point and the rotation center of the rotor, and the permanent magnets that form the first magnetic pole have a different radius from the permanent magnets that form the second magnetic pole.

6. The brushless motor according to claim 1, wherein:
the stator includes a plurality of tooth sections, which protrude toward a radial-direction inner side, and a coil, which is wound around the tooth sections through slots formed between the tooth sections, and a bridge section, which is provided at radial-direction inner-side tip portions of the tooth sections to connect the adjacent tip portions together; and
if circumferential-direction length of the bridge section is represented by W1, and a distance between the slits in the magnetic pole section of the same polarity by W2, W2 is set in such a way as not to be smaller than W1 (W1≤W2).

7. The brushless motor according to claim 1, wherein:
the magnet mounting holes are arranged in layers in the radial direction in the first and second magnetic poles; and
an end portion of the magnet mounting hole that is disposed in an outermost layer of the first magnetic pole contains a magnetic flux control section that controls an amount of magnetic flux flowing between the magnet mounting holes in the magnetic pole.

8. The brushless motor according to claim 6, wherein:
the magnet mounting holes are arranged in layers in the radial direction in the first and second magnetic poles; and
an end portion of the magnet mounting hole that is disposed in an outermost layer of the first magnetic pole contains a magnetic flux control section that controls an amount of magnetic flux flowing between the magnet mounting holes in the magnetic pole.

9. The brushless motor according to claim 7, wherein:
a longitudinal-direction end portion of the magnet mounting hole in the outermost layer contains a tapered section, which is made by forming a periphery of the magnet mounting hole into a straight line; and
the magnetic flux control section is formed between the tapered section and another magnet mounting hole that is disposed adjacent to an inner side of the outermost-layer magnet mounting hole.

10. The brushless motor according to claim 8, wherein:
a longitudinal-direction end portion of the magnet mounting hole in the outermost layer contains a tapered section, which is made by forming a periphery of the magnet mounting hole into a straight line; and
the magnetic flux control section is formed between the tapered section and another magnet mounting hole that is disposed adjacent to an inner side of the outermost-layer magnet mounting hole.

11. The brushless motor according to claim 7, wherein
a base point of the tapered section is located outside pole arc angle α of the magnet housed in the outermost-layer magnet mounting hole and inside aperture angle β of the outermost-layer magnet mounting hole.

12. The brushless motor according to claim 9, wherein
a base point of the tapered section is located outside pole arc angle α of the magnet housed in the outermost-layer magnet mounting hole and inside aperture angle β of the outermost-layer magnet mounting hole.

13. The brushless motor according to claim 7, wherein
in the tapered section, taper angle θt formed by line A that extends along the tapered section and line B at a position of an end portion of the magnet housed in the outermost-layer magnet mounting hole is greater than 0 degree and less than 90 degrees (0 degree <θt<90 degrees).

14. The brushless motor according to claim 8, wherein
in the tapered section, taper angle θt formed by line A that extends along the tapered section and line B at a position of an end portion of the magnet housed in the outermost-layer magnet mounting hole is greater than 0 degree and less than 90 degrees (0 degree <θt<90 degrees).

15. The brushless motor according to claim 9, wherein
in the tapered section, taper angle θt formed by line A that extends along the tapered section and line B at a position of an end portion of the magnet housed in the outermost-layer magnet mounting hole is greater than 0 degree and less than 90 degrees (0 degree <θt<90 degrees).

16. The brushless motor according to claim 10, wherein
in the tapered section, taper angle θt formed by line A that extends along the tapered section and line B at a position of an end portion of the magnet housed in the outermost-layer magnet mounting hole is greater than 0 degree and less than 90 degrees (0 degree <θt<90 degrees).

17. The brushless motor according to claim 11, wherein
the taper angle θt is between 68 degrees and 72 degrees.

18. The brushless motor according to claim 13 wherein
the taper angle θt is between 68 degrees and 72 degrees.

19. The brushless motor according to claim 1, wherein
regardless of whether the magnet mounting holes are for the first or second magnetic pole, the magnet mounting holes are formed along the radial direction in such a way as to have the same radius in the same layer.

20. The brushless motor according to claim 1, wherein
the brushless motor is used as a drive source for an electric power steering device.

* * * * *